United States Patent
Wu et al.

(10) Patent No.: US 10,802,209 B2
(45) Date of Patent: Oct. 13, 2020

(54) CLADDING LIGHT STRIPPER

(71) Applicant: Lumentum Operations LLC, Milpitas, CA (US)

(72) Inventors: Zong Kwei Wu, Milpitas, CA (US); Kwang Chong, Milpitas, CA (US); Martin H. Muendel, Milpitas, CA (US)

(73) Assignee: Lumentum Operations LLC, Milpitas, CA (US)

( * ) Notice: Subject to any disclaimer, the term of this patent is extended or adjusted under 35 U.S.C. 154(b) by 421 days.

(21) Appl. No.: 15/687,052

(22) Filed: Aug. 25, 2017

(65) Prior Publication Data

US 2017/0371097 A1 Dec. 28, 2017

Related U.S. Application Data

(63) Continuation-in-part of application No. 15/393,887, filed on Dec. 29, 2016, now Pat. No. 10,090,631, (Continued)

(51) Int. Cl.
*G02B 6/02* (2006.01)
*G02B 6/14* (2006.01)
(Continued)

(52) U.S. Cl.
CPC .... *G02B 6/02066* (2013.01); *B29D 11/00663* (2013.01); *G02B 6/14* (2013.01);
(Continued)

(58) Field of Classification Search
CPC .............. G02B 6/02066; G02B 6/2852; H01S 3/06733; B29D 11/00663
See application file for complete search history.

(56) References Cited

U.S. PATENT DOCUMENTS

| | | | |
|---|---|---|---|
| 3,933,455 | A | 1/1976 | Chown |
| 3,958,188 | A | 5/1976 | Fletcher |

(Continued)

FOREIGN PATENT DOCUMENTS

| | | |
|---|---|---|
| CN | 102255227 | 11/2011 |
| JP | 08304857 | 11/1996 |

(Continued)

OTHER PUBLICATIONS

Extended European Search Report for Application No. EP18189035, dated Feb. 14, 2019, 11 pages.

(Continued)

*Primary Examiner* — Eric L Bolda
(74) *Attorney, Agent, or Firm* — Harrity & Harrity, LLP

(57) ABSTRACT

A cladding light stripper may include a double-clad optical fiber having a core for guiding signal light, an inner cladding surrounding the core, and an outer cladding surrounding the inner cladding. The optical fiber may include a stripped portion forming an exposed section. The exposed section may include a plurality of spirally-arranged transversal notches disposed along the optical fiber to enable light to escape the inner cladding upon impinging on the plurality of notches. A circumferential segment of the optical fiber may include a single notch of the plurality of notches. Each of the plurality of notches may have a depth of only a partial distance to the core.

20 Claims, 21 Drawing Sheets

Related U.S. Application Data which is a continuation of application No. 14/166,600, filed on Jan. 28, 2014, now Pat. No. 9,547,121.

(60) Provisional application No. 61/757,434, filed on Jan. 28, 2013.

(51) Int. Cl.
   *G02B 6/28* (2006.01)
   *B29D 11/00* (2006.01)
   *G02B 6/26* (2006.01)
   *H01S 3/067* (2006.01)
   *H01S 3/094* (2006.01)

(52) U.S. Cl.
   CPC ........ *G02B 6/2852* (2013.01); *H01S 3/06733* (2013.01); *H01S 3/094007* (2013.01); *B29D 11/00682* (2013.01); *G02B 6/264* (2013.01); *H01S 3/06729* (2013.01)

(56) References Cited

U.S. PATENT DOCUMENTS

| | | | |
|---|---|---|---|
| 4,049,413 A * | 9/1977 | French | C03B 37/01228 65/392 |
| 4,097,118 A | 6/1978 | Hammer | |
| 4,400,056 A | 8/1983 | Cielo | |
| 4,465,335 A | 8/1984 | Eppes | |
| 4,549,782 A * | 10/1985 | Miller | G02B 6/2852 250/227.24 |
| 4,678,273 A | 7/1987 | Vilhelmsson | |
| 4,710,605 A | 12/1987 | Presby | |
| 4,842,405 A | 6/1989 | El-Sherif | |
| 4,911,516 A | 3/1990 | Palfrey | |
| 4,955,028 A | 9/1990 | Alferness | |
| 5,037,172 A | 8/1991 | Hekman et al. | |
| 5,321,257 A | 6/1994 | Danisch | |
| 5,432,876 A | 7/1995 | Appeldorn et al. | |
| 5,500,913 A | 3/1996 | Allen | |
| 5,659,643 A | 8/1997 | Appeldorn et al. | |
| 5,790,735 A | 8/1998 | Oleskevich | |
| 5,854,865 A | 12/1998 | Goldberg | |
| 6,087,655 A | 7/2000 | Kobrin | |
| 6,243,515 B1 | 6/2001 | Heflinger | |
| 6,535,667 B1 * | 3/2003 | Gozum | B29C 59/021 156/85 |
| 6,624,927 B1 | 9/2003 | Wong et al. | |
| 6,801,550 B1 | 10/2004 | Snell et al. | |
| 6,865,316 B1 | 3/2005 | Pratt | |
| 6,975,792 B1 | 12/2005 | Goldberg et al. | |
| 7,221,840 B2 | 5/2007 | Vienne et al. | |
| 7,324,723 B2 | 1/2008 | Shioda et al. | |
| 7,373,070 B2 | 5/2008 | Wetter et al. | |
| 7,526,165 B2 | 4/2009 | Nielsen et al. | |
| 7,839,901 B2 * | 11/2010 | Meleshkevich | G02B 6/03616 372/6 |
| 8,027,557 B2 | 9/2011 | Frith | |
| 8,229,260 B2 | 7/2012 | Frith | |
| 8,355,608 B2 | 1/2013 | Hu | |
| 9,547,121 B2 | 1/2017 | Hou et al. | |
| 2003/0174962 A1 | 9/2003 | Poole | |
| 2005/0117860 A1 | 6/2005 | Vienne | |
| 2007/0071389 A1 * | 3/2007 | Yoon | G02B 6/02066 385/37 |
| 2007/0258673 A1 | 11/2007 | El-Sherif | |
| 2008/0247424 A1 | 10/2008 | Sacks et al. | |
| 2010/0097822 A1 | 4/2010 | Mersch et al. | |
| 2010/0135339 A1 | 6/2010 | Meleshkevich | |
| 2010/0163537 A1 | 7/2010 | Keisuke | |
| 2011/0103743 A1 | 5/2011 | Baets | |
| 2012/0070115 A1 | 3/2012 | Langseth et al. | |
| 2012/0262781 A1 | 10/2012 | Price et al. | |
| 2013/0299474 A1 | 11/2013 | Kashiwagi et al. | |
| 2017/0110845 A1 | 4/2017 | Hou et al. | |

FOREIGN PATENT DOCUMENTS

| | | |
|---|---|---|
| JP | 2007/227713 | 9/2007 |
| JP | 2008/187100 | 8/2008 |
| JP | 20080268747 | 11/2008 |
| JP | 2008/293004 | 12/2008 |
| JP | 2010181574 | 8/2010 |
| JP | 2011/525706 | 9/2011 |
| JP | 2012/014173 | 1/2012 |
| JP | 2012/114299 | 6/2012 |
| JP | 2014010427 | 1/2014 |
| JP | 2014/126687 | 7/2014 |
| JP | 2016029454 A | 3/2016 |
| WO | 2007/080703 | 7/2007 |
| WO | 2008/123609 | 10/2008 |
| WO | 2010/128675 | 11/2010 |
| WO | 2011/067908 | 6/2011 |
| WO | 2001067908 | 6/2011 |
| WO | 2007/080703 | 6/2012 |
| WO | 2012088267 | 6/2012 |
| WO | 2014002715 A1 | 1/2014 |
| WO | 2012099116 | 6/2014 |

OTHER PUBLICATIONS

Alexandre Wetter et al., "High power cladding light strippers," Fiber Lasers V: Technology, Systems, and Applications, ed. Jes Broeng and Clifford Headley, Proc. of SPIE vol. 6873,687327, (2008), pp. 1-8.

K. Imen et al., "Laser-fabricated fiber-optic taps," Optic Letters, vol. 15, No. 17, Sep. 1, 1990, pp. 950-952.

Boyd et al., "Advances in CO2 laser fabrication for high power fibre laser devices," Proceedings of the SPIE, vol. 9728, pp. 972838-1-972838-7, Mar. 2016, 7 pages.

Heptonstall et al., "CO2 laser production of fused silica fibers for use in interferometric gravitational wave detector mirror suspensions," Review of Scientific Instruments, vol. 52, Issue 1, pp. 011301-011301-9, Jan. 2011, 9 pages.

* cited by examiner

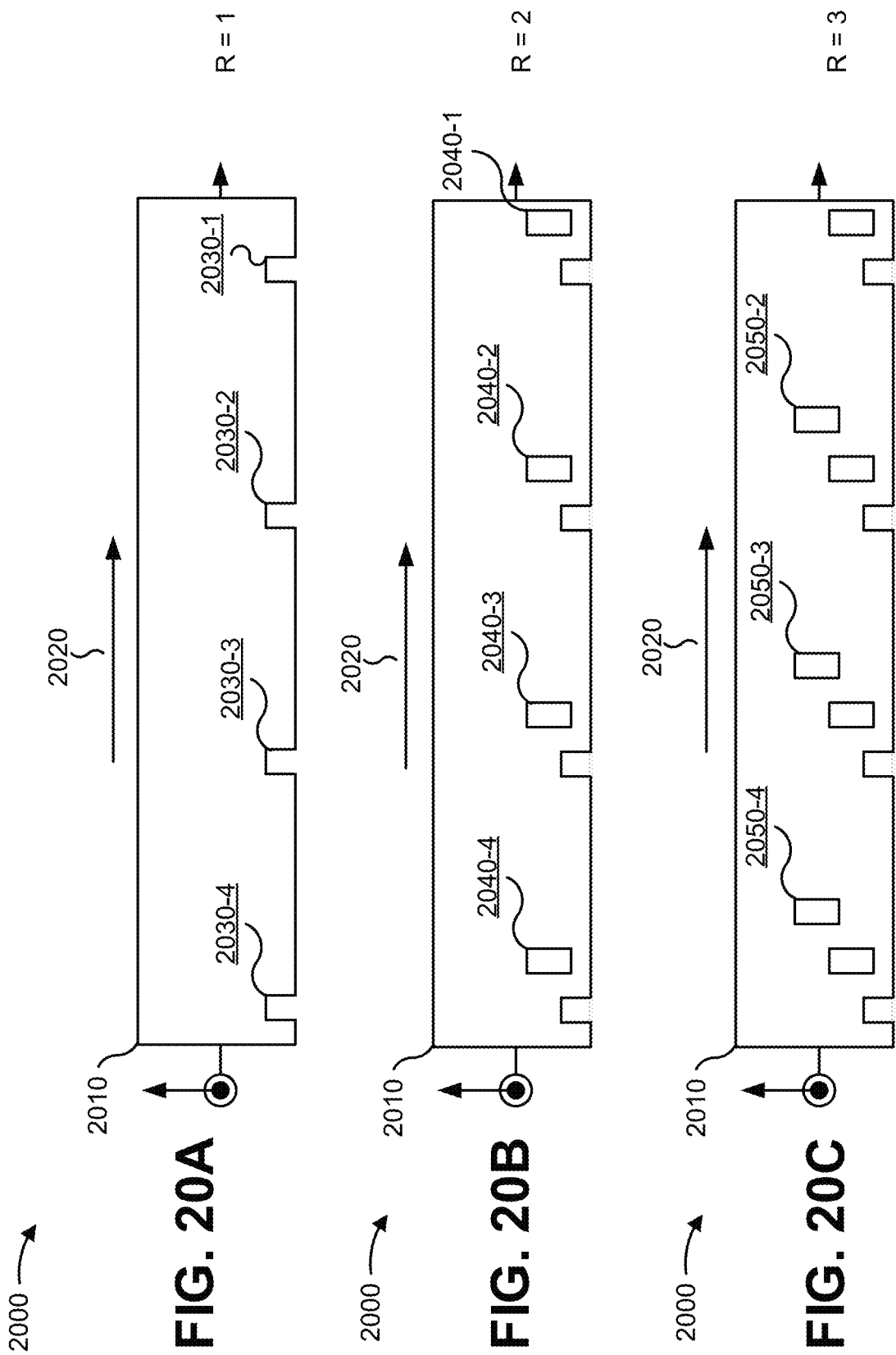

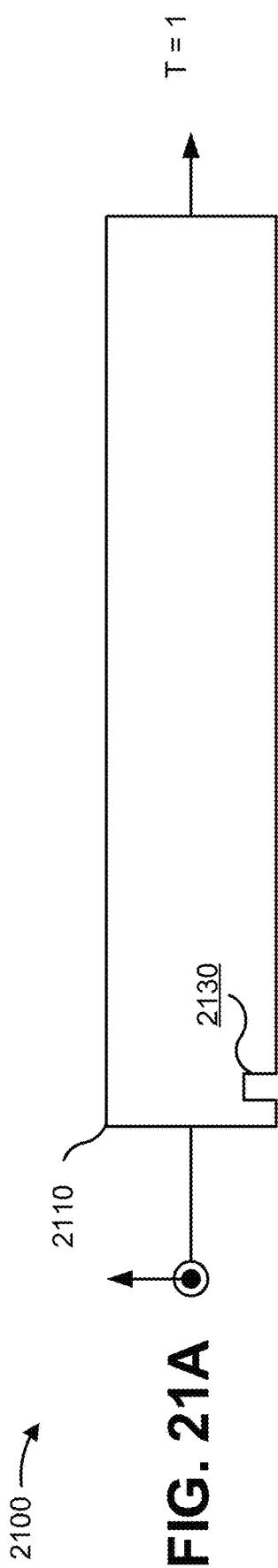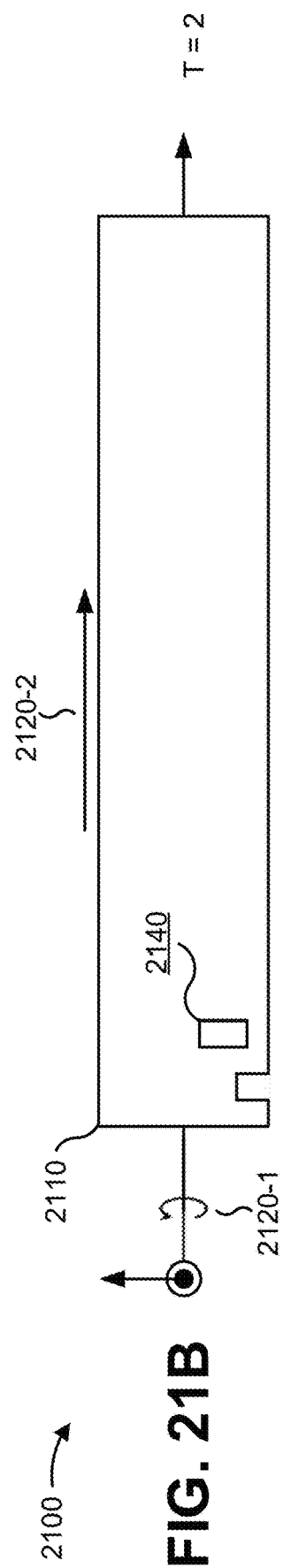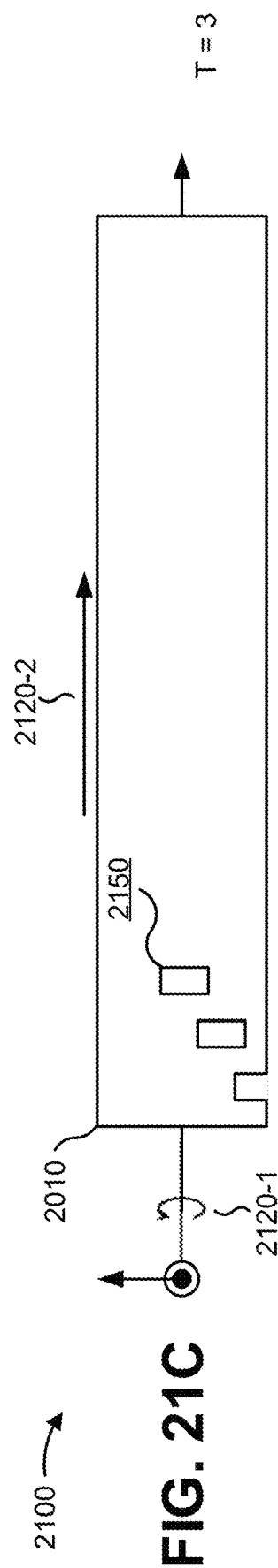

CLADDING LIGHT STRIPPER

RELATED APPLICATION(S)

This application is a continuation-in-part of U.S. patent application Ser. No. 15/393,887, filed on Dec. 29, 2016, the content of which is incorporated by reference herein in its entirety; which is a continuation of U.S. patent application Ser. No. 14/166,600 (now U.S. Pat. No. 9,547,121), filed on Jan. 28, 2014, the content of which is incorporated by reference herein in its entirety; which claims priority to U.S. Provisional Patent Application 61/757,434, filed Jan. 28, 2013, the content of which is incorporated by reference herein in its entirety.

TECHNICAL FIELD

The present invention relates to optical fiber devices and related methods, and in particular to devices and methods for removing cladding light in fiber amplifiers and lasers.

BACKGROUND

Fiber lasers are an important new class of lasers that provide significant advantages of efficiency and practicality in comparison with other laser types, such as free-space lasers. With the advent of a double-clad fiber (DCF), fiber lasers have been scaled to kilowatt (kW) power levels. In a DCF, pump light propagates in a relatively large inner cladding, typically 125 to 600 micrometers in diameter, and the laser light propagates in the much smaller core, typically 5 to 100 micrometers in diameter. The core is doped with ions of a rare-earth element, such as Ytterbium, and is surrounded by the inner cladding, which guides the pump light to be absorbed in the doped core for laser light amplification along the entire fiber length. Ideally, at the output of the laser, no light will be propagating in the inner cladding, and all of the output laser beam will originate from the core. In some fiber laser systems, it is similarly desirable to have exclusively core light propagating between components or between amplification stages.

In practice, the output of a fiber laser or amplifier based on a DCF consists of some core light and some cladding light. The cladding light may contain residual unabsorbed pump light and any laser light that has escaped from the core into the cladding (e.g. due to scattering or spontaneous emission in the core). The cladding light may contain optical beams at a large range of divergence angles and a variety of wavelengths, depending on their source(s) and the construction of the laser system. The cladding light is deleterious for a number of applications, and should preferably be removed, or "stripped," from the fiber. For high-power fiber sources, more than 300 watts (W) of cladding light may be present, and safely and efficiently removing this light represents a significant technological challenge. Typically, the stripped cladding light is converted to heat, and care must be taken to avoid overheating fiber coatings or other components such as ferrules, splice protectors, or the like. Fiber optic components frequently contain polymers with a limited operating temperature range (e.g., less than 85 degrees Celsius (° C.) maximum continuous operating temperature for some common fiber-optic polymers). To obtain a high light stripping efficiency, the stripped cladding light must be prevented from re-entering the inner cladding. Furthermore, the device used to strip the cladding light should not introduce optical losses or otherwise perturb light propagating in the fiber core.

Most prior-art cladding light strippers (CLS) use a thin layer of a high index polymer, which is applied to the cladding to "un-guide" cladding light. For example, Vilhelmsson in U.S. Pat. No. 4,678,273; Pratt in U.S. Pat. No. 6,865,316; and Frith in U.S. Pat. Nos. 8,027,557 and 8,229,260 disclose devices for stripping cladding light, which operate by coupling to the cladding a layer or layers that are index-matched to the cladding, or have a refractive index higher than the refractive index of the cladding.

Referring to FIG. 1A, an index-matching cladding light stripper 10A includes an optical fiber 11 having a core 19, a cladding 12, and a coating 13, which is stripped from the cladding 12 in a middle area 14 of the optical fiber 11. A high-index polymer layer 15 is applied to the cladding 12 in the middle area 14. In operation, cladding light 16 is guided by the cladding 12. When the cladding light 16 is coupled to the high-index polymer layer 15 in the middle area 14, the cladding light 16 is coupled out of the cladding 12, as shown in FIG. 1A.

The index-matching cladding light stripper 10A can sometimes achieve good efficiency of stripping cladding light, yet its optical power scalability is limited by the highest temperature the high-index polymer layer 15 can handle, typically in the range of 100° C. to 150° C. Scaling up cladding light power using high-index or index-matched layers is challenging and limited, because using high index polymer to strip out the light has no or little ability to control stripping rate. Hence, the power handling capability of the index-matching cladding light stripper 10A is limited by localized heating.

In several prior art systems, refractive index or the thickness of polymer is selected to facilitate more even temperature distribution. For example, Meleshkevich et al. in U.S. Pat. No. 7,839,901 disclose a polymer coating having a refractive index that decreases with temperature. The polymer is index-matched to a cladding the polymer is coated upon. When the polymer overheats due to absorption of released cladding light, the polymer's refractive index decreases, thereby limiting the local release of light from the cladding and the resultant heating, causing the cladding light to be released at some location downstream of the overheated point. As a result, the heat release becomes more uniform.

Optical and thermal properties of polymer-based cladding strippers, such as absorption of infrared (IR) radiation, spectral dependence, heating rate, and thermal damage threshold, contribute to limiting the maximum cladding light power that can be stripped to approximately 100 W. In a practical fiber laser system, cladding light usually includes high numerical aperture (NA) residual pump light and low NA scattered core light. The low NA light is difficult to remove with polymer based cladding light strippers, since the strip rate of these strippers is very sensitive to NA of the light. High NA light tends to strip out in a much shorter distance compared to low NA light. Heat load of polymer based cladding light strippers is highly non-uniform, and extra length must be used to achieve desired strip rate for the low NA cladding light.

Langseth et al. in US Patent Application Publication No. 2012/0070115 and Majid et al. in a PCT Application No. WO 2012088267 disclose optical fibers having a roughened outer surface of the cladding, to scatter the light out of the cladding. By way of example, referring to FIG. 1B, a roughened-surface cladding light stripper 10B includes the optical fiber 11 having the core 19, the cladding 12, and the coating 13, which is stripped off the cladding 12 in the middle area 14 of the optical fiber 11. An outer surface 18 of the cladding 12 is roughened in the exposed middle area 14. In operation, the cladding light 16 is guided by the cladding 12. When the cladding light 16 is coupled to the roughened outer surface 18, the cladding light 16 is scattered out of the cladding 12 as shown in FIG. 1B.

One advantage of this approach is that the cladding stripper can be polymer free. Detrimentally, most of the cladding light is stripped in the upstream portion of the cladding stripper, creating uneven temperature distribution in the stripper. Furthermore, roughening the surface may generate micro-cracks that can propagate over time and cause the fiber to fail.

SUMMARY

It is a goal of some aspects, described herein, to provide a manufacturable, customizable cladding light stripper suitable for high power fiber lasers.

Some cladding strippers described herein include a plurality of transversal notches or grooves in an outer surface of an inner cladding of a double clad optical fiber. Advantageously, position and orientation of the notches can be selected to even out cladding light release along the cladding light stripper, enabling a more even temperature distribution due to released cladding light. Furthermore, a cladding stripper can be made polymer-free, thus allowing scaling to high optical power levels.

In accordance with some aspects of the invention, there is provided a cladding light stripper comprising: a double-clad optical fiber having a core for guiding signal light, an inner cladding surrounding the core, and an outer cladding surrounding the inner cladding, wherein the optical fiber includes a stripped portion wherein the outer cladding is removed, forming an exposed section of an outer surface of the inner cladding, wherein the exposed section includes a plurality of transversal notches disposed along the fiber, to enable light to escape the inner cladding upon impinging on the notches, wherein each of the plurality of notches has a depth of only a partial distance to the fiber core.

The cladding light stripper can include an opaque screen or heat sink disposed adjacent the stripped portion of the outer cladding, for absorbing light escaped the inner cladding, and for dissipating heat produced by the absorbed light.

In accordance with some aspects of the invention, there is further provided an optical fiber amplifier comprising the cladding light stripper, an amplifier double-clad optical fiber portion coupled to the double-clad optical fiber of the cladding light stripper at a first end of the amplifier double clad optical fiber portion, and a pump diode optically coupled to the inner cladding at a second opposing end of the amplifier double clad optical fiber portion, for providing the pump light for propagation from the second end to the first end of the amplifier double clad optical fiber portion.

In accordance with some other aspects of the invention, there is further provided a fiber laser comprising the optical fiber amplifier including the cladding light stripper, and an oscillator optically coupled to the optical fiber amplifier.

In accordance with some other aspects of the invention, there is further provided a method of forming the cladding light stripper of claim 1, the method comprising: a) removing a portion of the outer cladding leaving the exposed section of the inner cladding; b) focusing a laser beam on the outer surface of the inner cladding in the exposed section to evaporate and remove the inner cladding locally to form a transversal notch in the inner cladding; and c) repeating step b) a plurality of times at different locations along the exposed section.

According to some aspects of the invention, a cladding light stripper may include an optical fiber having a core for guiding signal light and a cladding surrounding the core. The cladding may include a set of notches. Each notch in the set of notches may have a depth into the cladding of only a partial distance to the core. Notches, in the set of notches, may be disposed relative to each other longitudinally and angularly along the optical fiber to enable light to escape the cladding upon impinging on a notch.

According to some aspects of the invention, a cladding light stripper may include a double-clad optical fiber having a core for guiding signal light, an inner cladding surrounding the core, and an outer cladding surrounding the inner cladding. The optical fiber may include a stripped portion where the outer cladding is removed forming an exposed section of the inner cladding having a depth of only a partial distance to the fiber core to enable light to escape the optical fiber upon impinging on at least one of the plurality of notches. A notch, of the plurality of notches, may be disposed such that another notch of the plurality of notches, immediately preceding the notch longitudinally or immediately succeeding the notch longitudinally, is displaced laterally relative to the notch.

According to some aspects of the invention, a cladding light stripper may include a double-clad optical fiber having a core for guiding signal light, an inner cladding surrounding the core, and an outer cladding surrounding the inner cladding. The optical fiber may include a stripped portion forming an exposed section. The exposed section may include a plurality of spirally-arranged transversal notches disposed along the optical fiber to enable light to escape the inner cladding upon impinging on the plurality of notches. A circumferential segment of the optical fiber may include a single notch of the plurality of notches. Each of the plurality of notches may have a depth of only a partial distance to the core.

BRIEF DESCRIPTION OF THE DRAWINGS

Exemplary embodiments will now be described in conjunction with the drawings.

FIGS. 20A-20C are diagrams illustrating an example of manufacturing a cladding light stripper;

FIGS. 21A-21C are diagrams illustrating an example of manufacturing a cladding light stripper;

DETAILED DESCRIPTION

The following detailed description of example implementations refers to the accompanying drawings. The same reference numbers in different drawings may identify the same or similar elements.

While the present teachings are described in conjunction with various embodiments and examples, it is not intended that the present teachings be limited to such embodiments. On the contrary, the present teachings encompass various alternatives and equivalents, as will be appreciated by those of skill in the art.

Figure 1A:
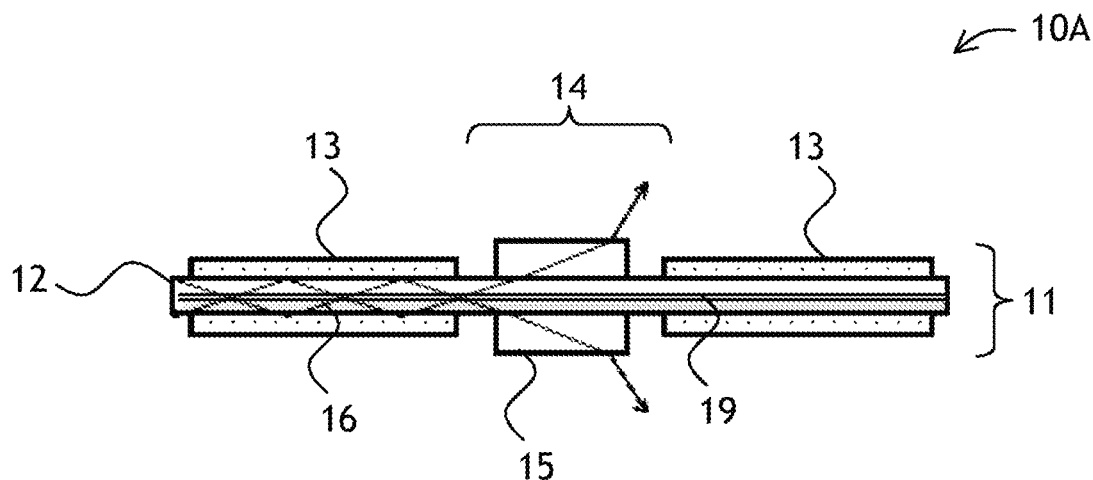
FIGS. 1A and 1B are side cross-sectional views of prior-art index-matching and roughened-surface cladding light strippers, respectively.
Figure 1B:
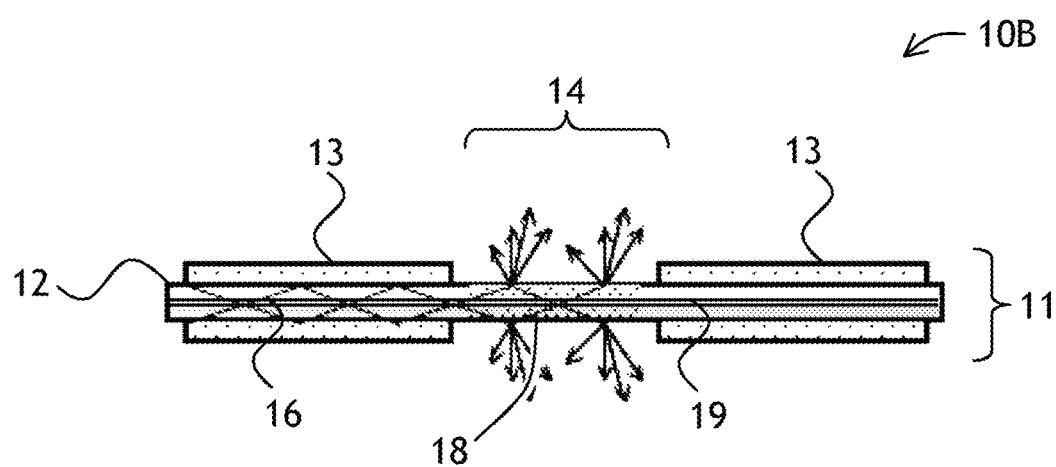
Figure 2A:
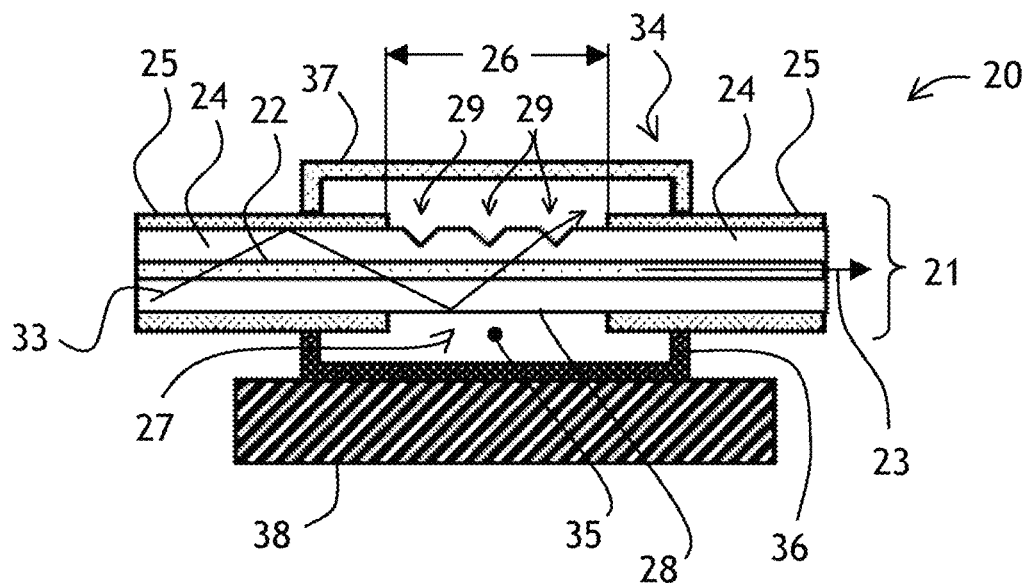
FIG. 2A is a side cross-sectional view of a cladding light stripper according to one embodiment of the invention.
Figure 2B:
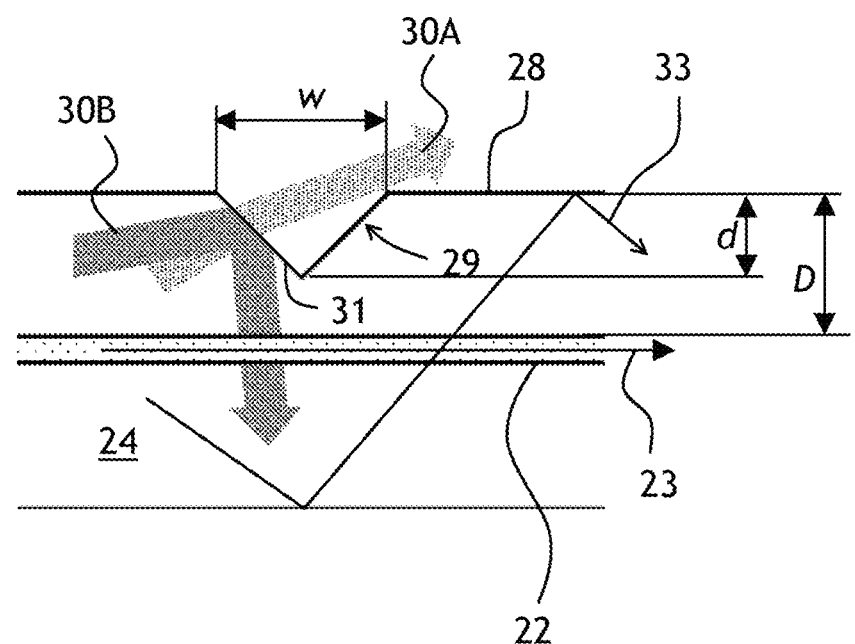
FIG. 2B is a magnified view of FIG. 1A showing cladding light reflecting and refracting at a surface of a notch.

Referring to FIGS. 2A and 2B, a cladding light stripper 20 includes a double-clad optical fiber 21 having a core 22 for guiding signal light 23, an inner cladding 24 surrounding the core 22, and an outer cladding 25 surrounding the inner cladding 24. The optical fiber 21 includes a stripped portion 26 wherein the outer cladding 25 is removed, forming an exposed section 27 of an outer surface 28 of the inner cladding 24. Thus, the stripped portion 26 is absent the outer cladding 25. The exposed section 27 includes a plurality of transversal notches 29 disposed along the fiber 21 in the exposed section 27 of the outer surface 28 of the inner cladding 24 to enable cladding light portions 30A, 30B (FIG. 2B) to escape the inner cladding 24 upon impinging on the notches 29 by refracting through a side surface 31 of the notches 29 (light portion 30A) or reflecting from the side surface 31 (light portion 30B). Herein, the term "transversal" is not limited to the notches 29 being perpendicular to the optical fiber 21 (i.e., the notches 29 can be angled with respect to the optical fiber 21, while still being "transversal"). Each of the plurality of notches 29 has a width w and a depth d of only a part of a distance D (FIG. 2B) to the fiber core 22. In other words, each notch 29 is clear of the fiber core 22, not touching, or expanding into the fiber core 22. At least 10 notches 29, and more preferably at least 30 notches 29 can be provided. The depths of the notches 29 can be, for example, between 5% and 20% of the diameter of the inner cladding, or 20 micrometers to 80 micrometers deep.

In the embodiment shown in FIG. 2A, the cladding light stripper 20 includes an optional heat sink 34 disposed adjacent the stripped portion 26 of the outer cladding 25, for absorbing the light portions 30A, 30B that escaped the inner cladding 24, and for dissipating heat produced by the absorbed light portions 30A, 30B. To that end, the heat sink 34 forms a cavity 35 around the stripped portion 26 for intercepting the light portions 30A, 30B, which escaped the inner cladding 24. Preferably, the cavity 35 has an absorbing portion 36 and a reflecting portion 37 for directing the escaped light portions 30A, 30B to the absorbing portion 36. The absorbing portion 36 can be thermally connected to an external heat sink 38. The heat sink 34 can also be made out of other material with high heat conductivity of at least 10 Watts per meter Kelvin (W/m–K), more preferably greater than at least 100 W/m–K, such as aluminum or copper, for example.

Figure 3:
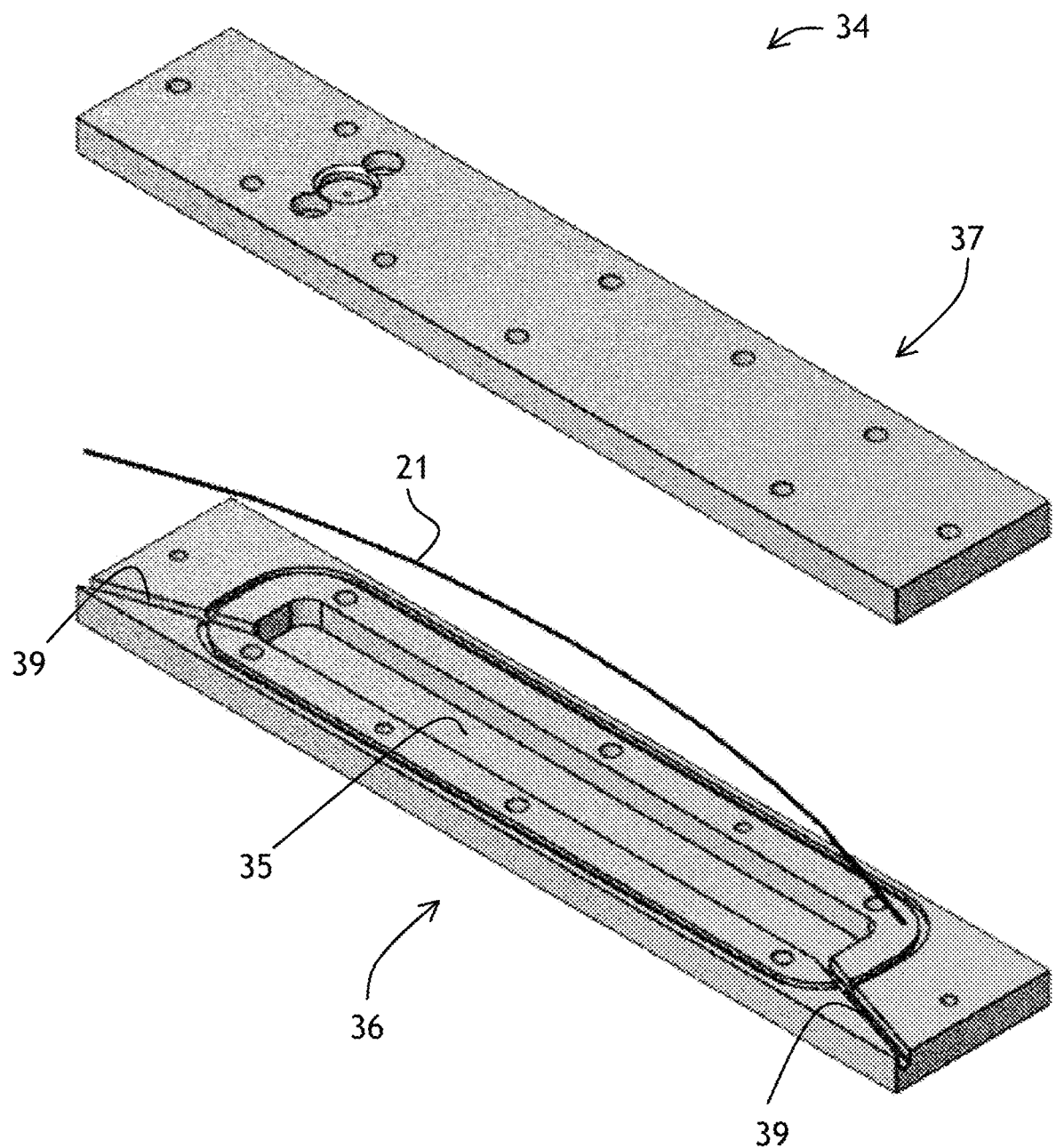
FIG. 3 is an exploded three-dimensional view of a heat sink of the cladding light stripper of FIG. 2A.

A prototype of the heat sink 34 is shown in FIG. 3. The absorbing 36 and reflecting 37 portions of the heat sink 34 of FIG. 3 are made out of aluminum blocks. The cavity 35 is machined in the absorbing portion 36. Grooves 39 are machined in the absorbing portion 36 for guiding and holding the optical fiber 21. The grooves 39 ensure that the optical fiber 21 is slightly bent in the heat sink 34, preferably to a bending radius of between 50 centimeters (cm) and 200 cm. The bending is done for two reasons: first, to relieve thermally induced stresses in the fiber 21 and second, to improve stripping rate, as will be explained below. The absorbing portion 36 is black-anodized, while the reflecting portion 37 is polished or white-anodized. The dimensions of the heat sink 34 of FIG. 3 are 220 millimeters (mm)×32 mm×11 mm, preferably, at least 40 mm, and more preferably at least 160 mm of the outer cladding 25 of the fiber 21 can be stripped to form the stripped portion 26. When 160 mm of the outer cladding 25 is removed, at least 140 mm of the outer surface 28 of the inner cladding 24 can be made available for forming the notches 29. The number of the notches 29 per unit length, herein termed "pitch," can vary from 1 notch/cm to 1000 notches/cm, and more preferably from 10 notches/cm to 500 notches/cm.

The optical fiber 21 can be either an active fiber providing gain in fiber lasers and fiber optical amplifiers or a passive fiber, e.g. an output fiber spliced onto an active fiber or a power-delivery fiber that can be used with any laser. In the active optical fiber 21, the core 22 includes a dopant (e.g., rare earth ions such as Ytterbium and/or Erbium ions) for amplifying the signal light 23 when pumped by pump light 33 (FIGS. 2A and 2B) guided by the inner cladding 24. In operation, the optical fiber 21 is pumped by coupling a pump light source, not shown in FIGS. 2A and 2B, into the inner cladding 24. The pump light 33 is mostly absorbed by the rare earth ions in the core 22. The rare earth ions amplify the signal light 23 propagating in the core 22. Usually, a portion of the pump light 33, herein termed "residual pump light," remains unabsorbed. The light portions 30A and 30B originate mostly from the residual pump light 33; however, they can also originate from the signal light 23 scattered or spontaneously emitted from the core 22. Typically, the residual pump light 33 is a high NA light and the scattered signal light 23 is a low NA light. The amount of light escaping from the cladding 24 depends on the divergence of the cladding light 33 and the depth of the notches 29. For low NA light, part of the escaped light can re-enter the inner cladding 24. Cladding light strip rate can be adjusted by adjusting size of the notches 29, angle of incident and the geometry of the notches 29, the pitch of the notches 29, and some other parameters, as discussed below.

The notches 29 can be made on multiple sides of the optical fiber 21. Referring to FIGS. 4A to 4D with further reference to FIG. 2A, the notches 29 can be made on one side (FIG. 4A), on two sides (FIG. 4B), three sides (FIG. 4C), four sides (FIG. 4D), and so on, spaced around a circumference of the exposed section 27. The notches 29 can be spaced both along the length of the exposed section 27 and around the circumference of the exposed section 27. Furthermore, the notches 29 can be disposed in a helical pattern around the core 22 of the double-clad optical fiber 21.

For high power fiber laser applications, it is highly desirable to have comprehensive control of the cladding light strip rate along the cladding light stripper 20. The "strip rate" is defined as optical power loss of the cladding light 33 per unit length of the inner cladding 24, for example optical power loss in dB per unit length in mm. The desired strip rate is selected based on thermal management requirements, length limitation of the cladding light stripper 20, and other material properties limitations.

The strip rate can be varied by number of sides of the optical fiber 21 where the notches 29 are made. The strip rate is typically higher as the number of sides increases, since it provides more escaping points for the cladding 24 to scatter light out. The strip rate also increases with the density and the depth d of the notches 29.

Figure 4A:
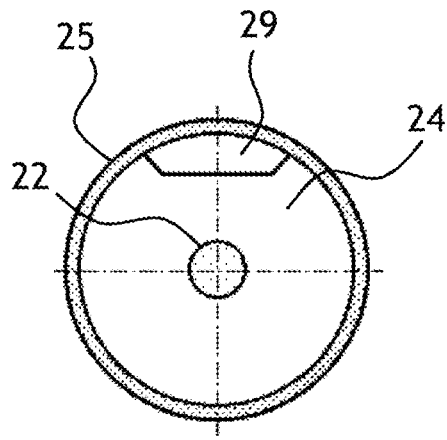
FIGS. 4A, 4B, 4C, and 4D are cross-sectional views of a double-clad optical fiber having notches on one, two, three, and four sides, respectively.
Figure 4B:
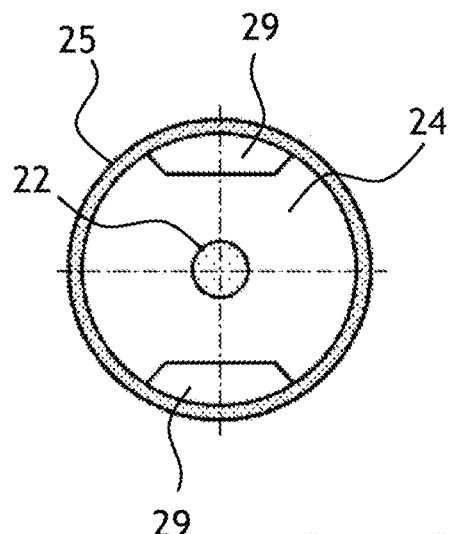
Figure 4C:
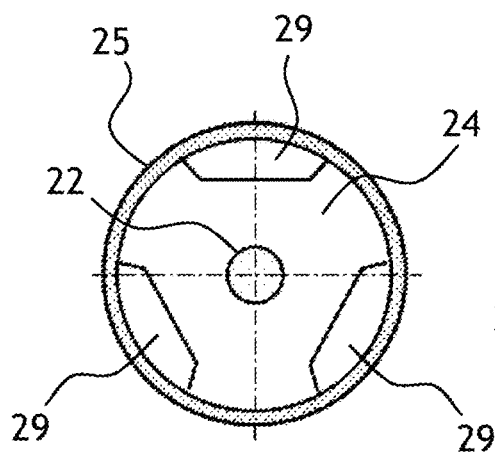
Figure 4D:
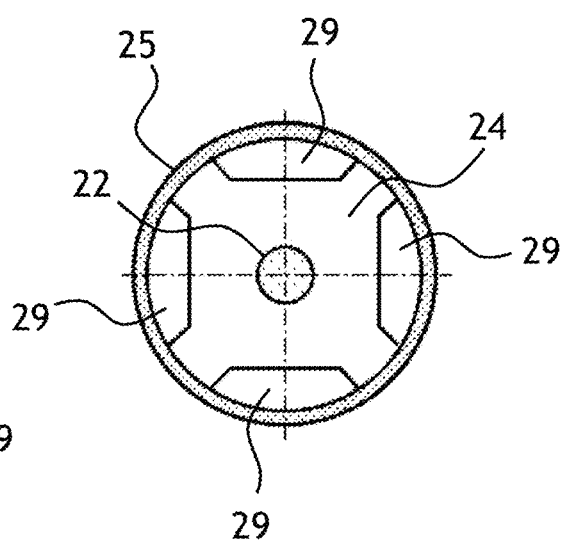
Figure 5:
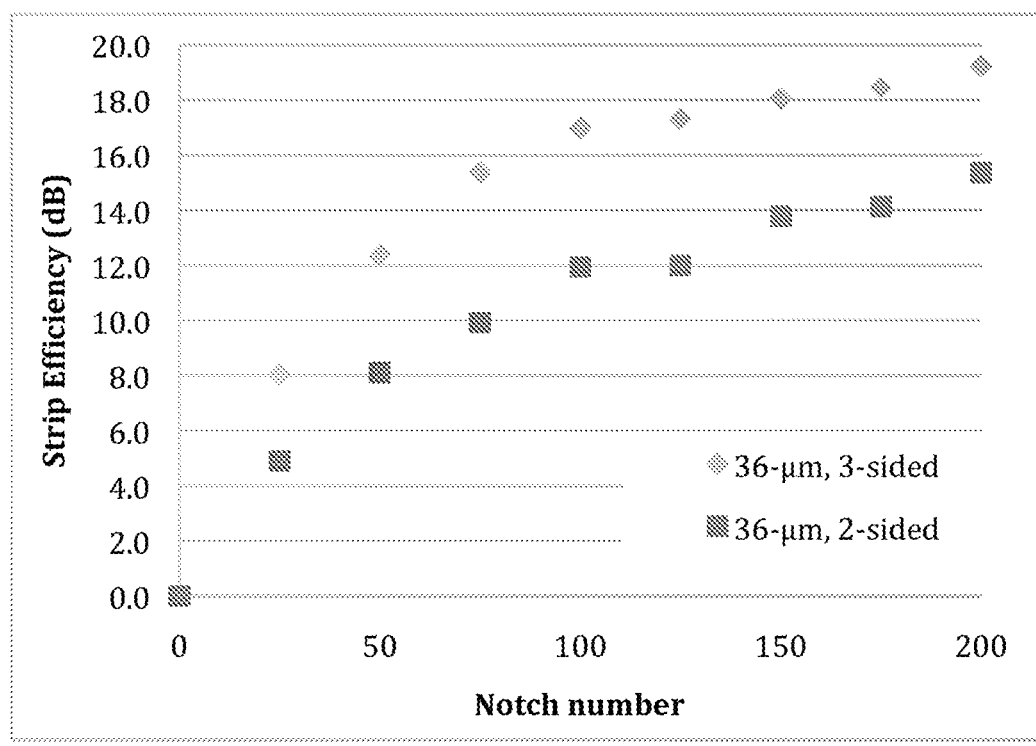
FIG. 5 is an experimental plot of strip efficiency vs. number of notches for two-sided and three-sided notches.

The total number of notches 29 impacts strip efficiency. The "strip efficiency" is defined herein as a total optical power loss after propagating through the cladding light stripper 20. The strip efficiency has been measured using prototypes of the cladding light stripper 20 with different number of notches 29 and number of sides the notches 29 are disposed on. Referring to FIG. 5, the 36 micrometer deep notches 29 (d=36 micrometers) have been made on a double-clad fused silica fiber measuring 400 micrometers in diameter when the outer (polymer) cladding was stripped away. The strip efficiency generally increases as the total number of the notches 29 increases. The strip efficiency shown in FIG. 5 is higher by about 3-4 decibels (dB) for three-sided notches (FIG. 4C) as compared with two-sided notches (FIG. 4B).

Figure 6:
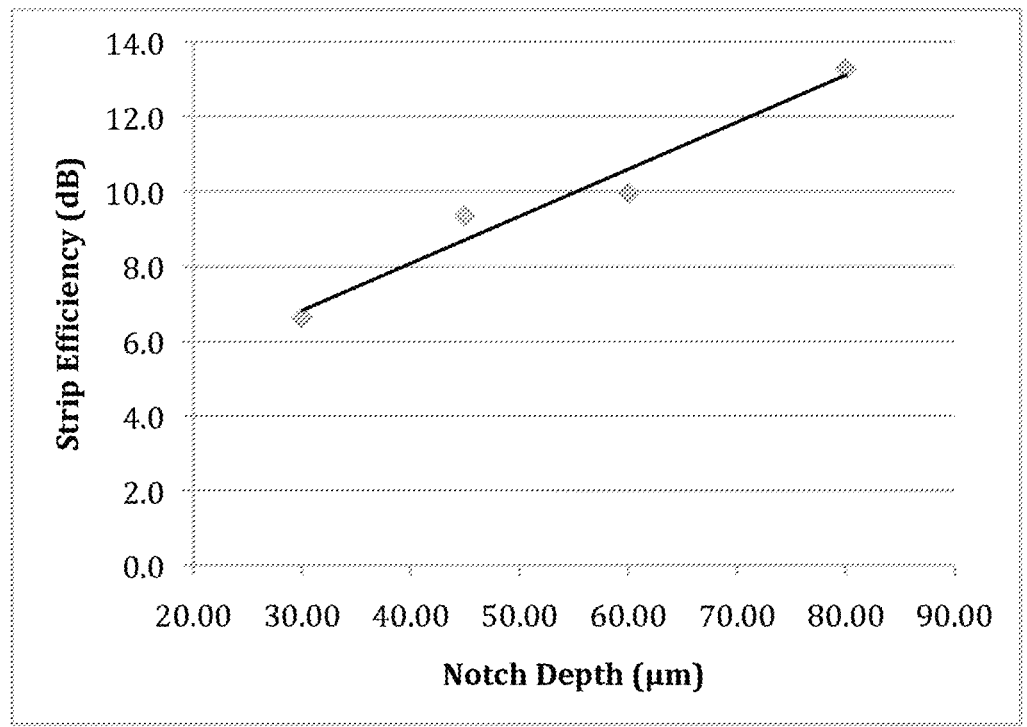
FIG. 6 is an experimental plot of strip efficiency vs. notch depth.

The strip rate and efficiency also depend on the geometry, for example, the width w, the depth d (FIG. 2B) of the notches 29, hence providing another engineering degree of freedom to control the strip efficiency. The depth d of the notches 29 is usually kept in between 5% and 20% of the fiber 21 diameter, to maintain the tensile strength of the fiber 21, and to lessen micro-bending on the core 22 due to the notches 29. Referring to FIG. 6, the strip efficiency has been measured as a function of the depth d of the notches 29, while other parameters such as the number of side surfaces 31, the number of notches 29, and a distance between the notches 29 were kept the same. It is seen that the strip efficiency changes by over 7 dB as the depth d increases from 30 micrometers to 80 micrometers.

Figure 7:
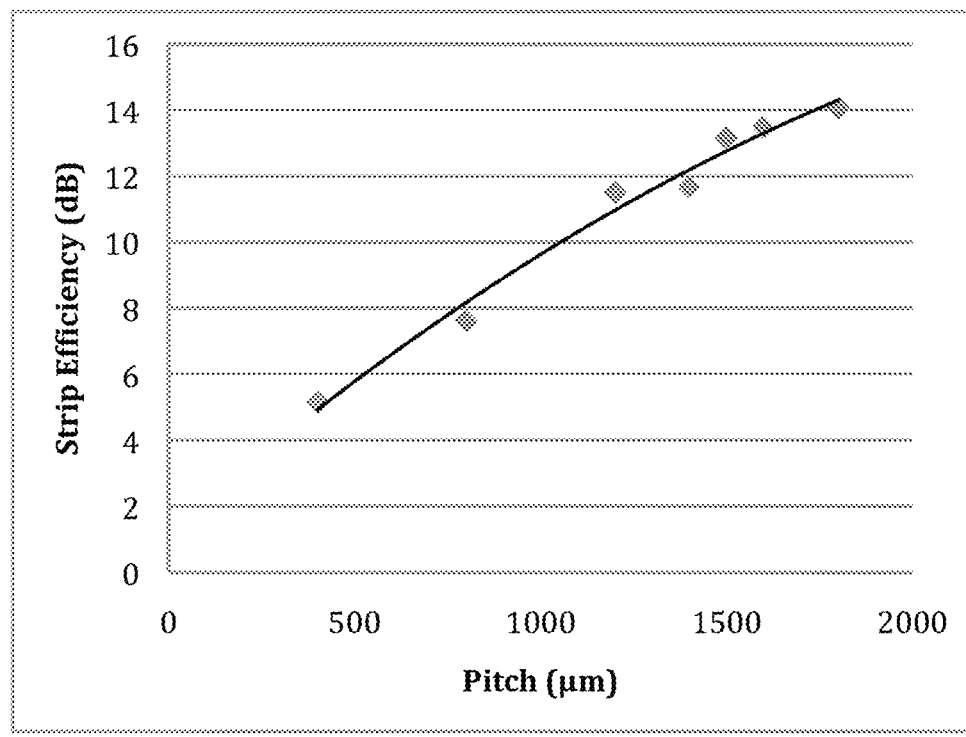
FIG. 7 is an experimental plot of strip efficiency vs. notch pitch.

Another way to optimize the strip rate and/or strip efficiency is by changing the distance between neighboring notches 29, herein termed "pitch," to allow propagation of un-escaped light to reach the next sets of notches 29. Turning to FIG. 7, the strip efficiency is shown as a function of the pitch parameter. The strip efficiency varies by approximately 9 dB as the pitch varies from 400 to 1800 micrometers.

Figure 8:
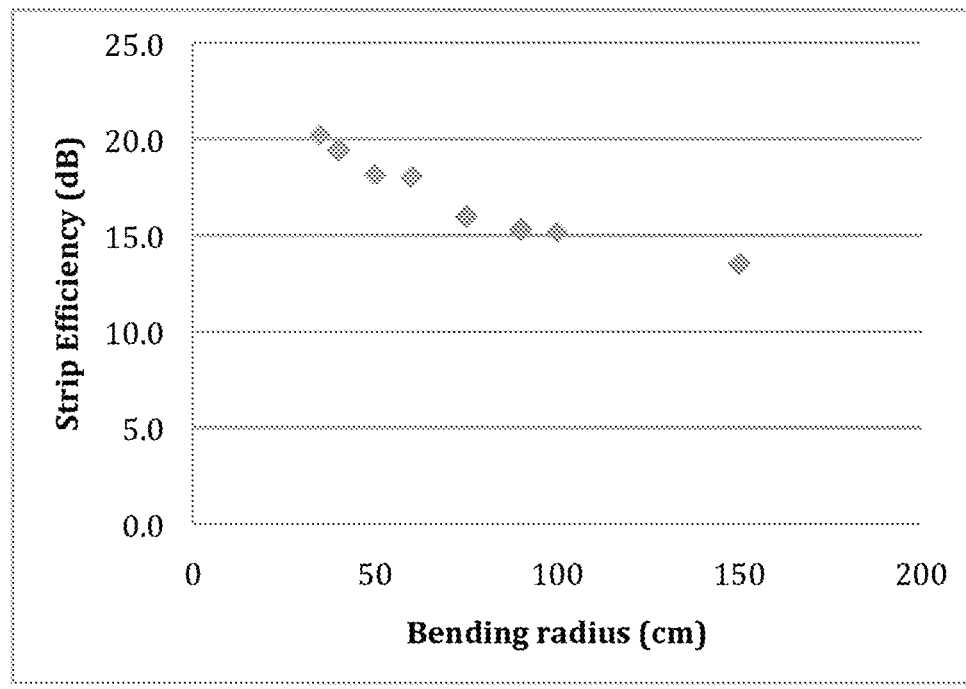
FIG. 8 is an experimental plot of strip efficiency vs. fiber bending radius.
Figure 9:
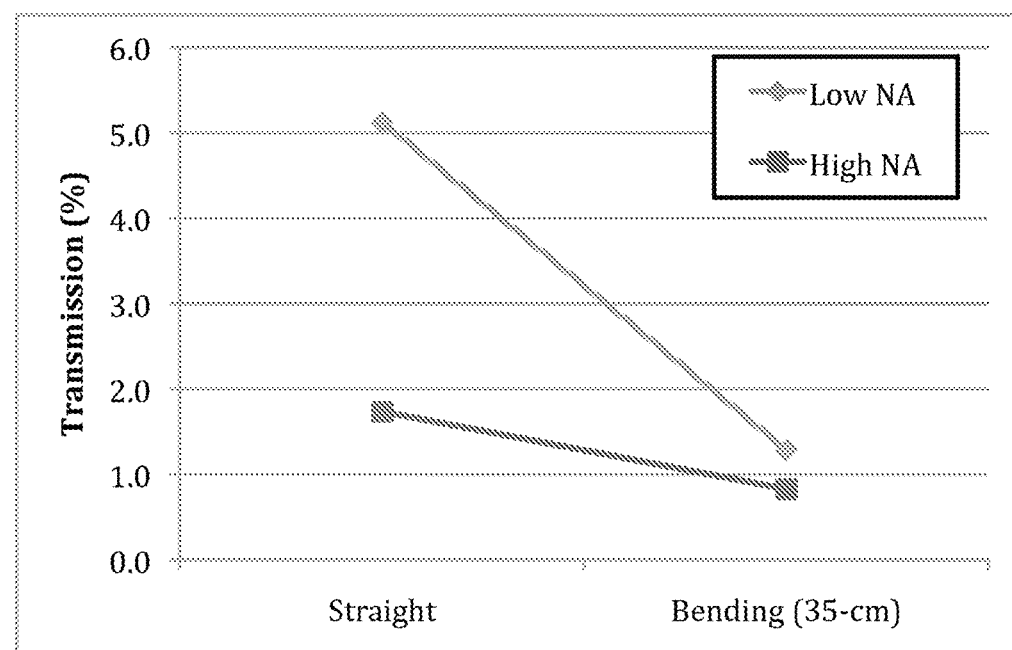
FIG. 9 is an experimental plot of optical transmission of low NA and high NA light as a function of bending radius.

The strip rate and efficiency are also sensitive to bending of the exposed section 27 of the cladding light stripper 20. As the bending of the exposed section 27 increases, incident angle relative to the surface of the notches 29 increases, therefore reducing the amount of light that will couple back to the inner cladding 24. As a result, the amount of light escaping from individual notches 29 increases, especially for low NA light, as shown in FIG. 8. The capability of the cladding light stripper 20 to remove low NA light is very important, since it can narrow down the strip rate difference for the low and high NA light, making it easier to control the heat distribution in the heat sink 34. One example of influence of the bending is shown in FIG. 9, showing that the difference in the strip efficiency for low and high NA light is greatly reduced when the optical fiber 21 is moderately bent to a radius of 35 cm.

The dependence of the strip rate and the strip efficiency on the number and depth d of notches 29, notch pitch, and the bending radius of the optical fiber 21 allows one to accommodate various cladding light stripping requirements in specific laser systems, such as power handling capability, cooling requirements, material constraints, requirement on device foot-print, and other constraints and requirements. Accordingly, one benefit of the cladding light stripper 20 is a highly flexible control of heat distribution. It is generally preferable to have very low strip rate at the beginning, or upstream, of the stripped portion 26, to limit optical power density of the light portions 30A, 30B escaping from the inner cladding 24. At the downstream of the stripped portion 26, it is desirable to increase the strip rate, in order to clean up the residual cladding mode light.

The amount of heat dissipated at a given point of the inner cladding 24 can be calculated by remaining cladding light power and the strip rate. In the case where the strip rate is constant along the length of an optical fiber, as in most conventional cladding light strippers using high index polymers, the heat load will be much higher at the beginning of the device, and decrease exponentially along the device. As the desired strip power goes up, this characteristic will cause very high temperatures at the beginning of the device, thereby limiting the amount of total power that the device can dissipate.

To optimize the heat dissipation in the cladding light stripper 20, one needs to know the desired dissipating power per unit length, which is dictated by the amount of total cladding light power, desired device footprint or the length of the cladding light stripper 20, or maximum heat density that the heat sink 34 can handle. One can then calculate the desired local strip rate along the cladding light stripper 20. Based on the strip rate per notch 29 as function of notch 29 size, pitch, and number of sides, one can adjust the notch pitch or size to achieve the desired strip rate.

Figure 10:
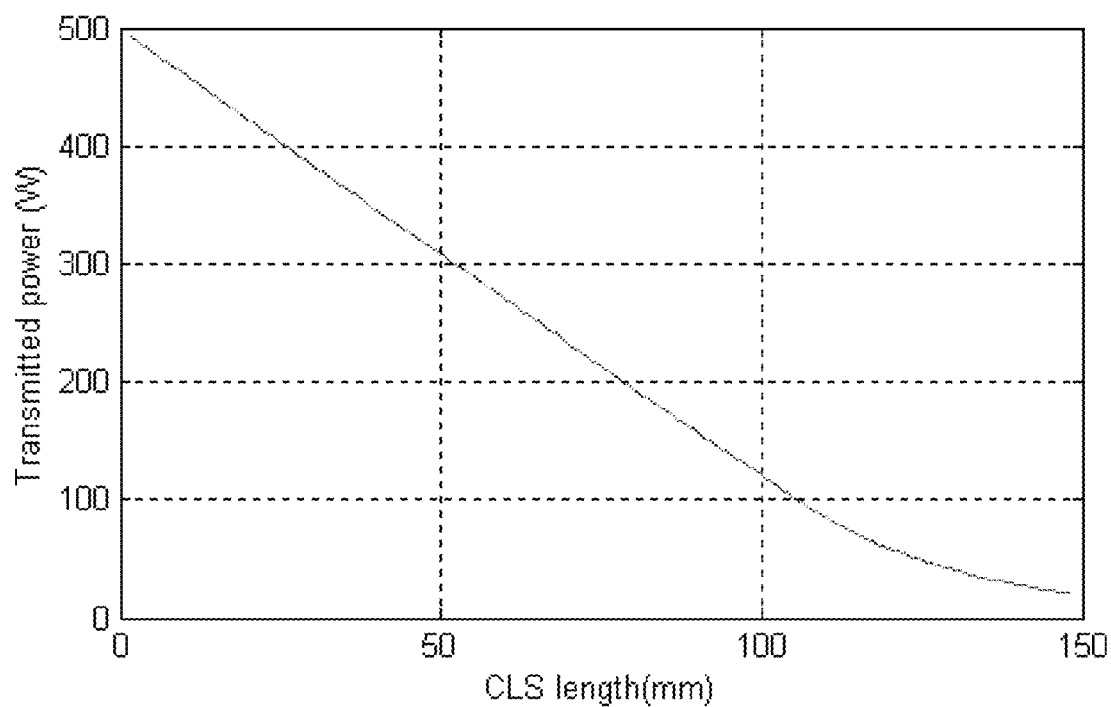
FIG. 10 is a calculated plot of transmitter power vs. cladding light stripper length for uniformly distributed notches.
Figure 11:
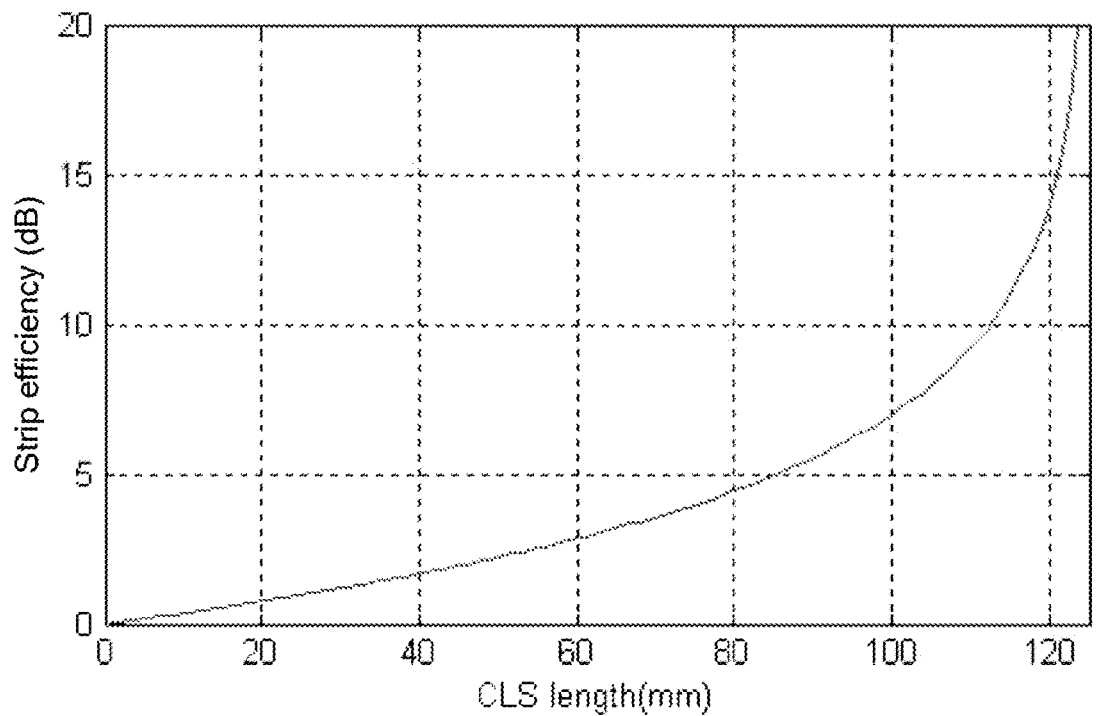
FIG. 11 is a calculated plot of strip efficiency vs. cladding light stripper length.
Figure 12:
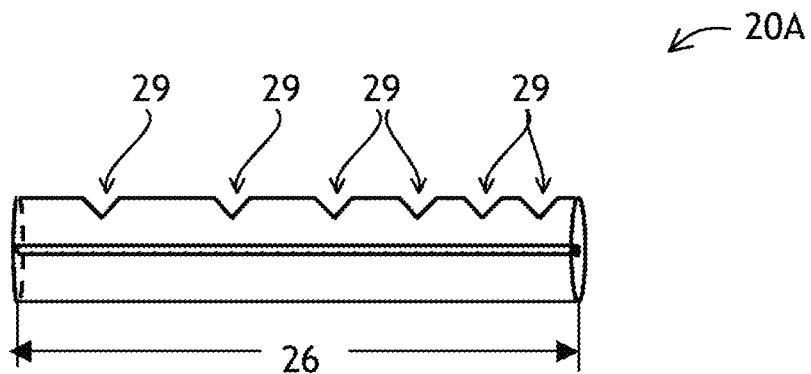
FIGS. 12 and 13 are side cross-sectional views of a cladding light stripper of the invention having varying notch pitch and notch depth, respectively.

Referring now to FIGS. 10, 11, 12, and 13 with further reference to FIG. 2A, an example of cladding light power dissipated at a constant strip rate is shown in FIG. 10. The transmitted optical power decreases almost linearly with the length along the cladding light stripper 20 (FIG. 2A). To even out the heat distribution along the cladding light stripper 20, the strip rate may be made lower at the beginning of the stripped portion 26, as illustrated in FIG. 11. To decrease the strip rate in the beginning of the stripped portion 26, either the notch density needs to be decreased in the beginning of the stripped portion 26, as shown in a cladding light stripper 20A of FIG. 12, or the notch depth d needs to be decreased in the beginning of the stripped portion 26, as shown in a cladding light stripper 20B of FIG. 13; or both the notch density and the notch depth d need to be decreased in the beginning of the stripped portion 26. Preferably, the notch pitch of the cladding light stripper 20A of FIG. 12 is gradually increasing from 2 notches/cm to 200 notches/cm, and more preferably from 5 notches/cm to 20 notches/cm, in going from left to right in FIGS. 12 and 13.

Figure 13:
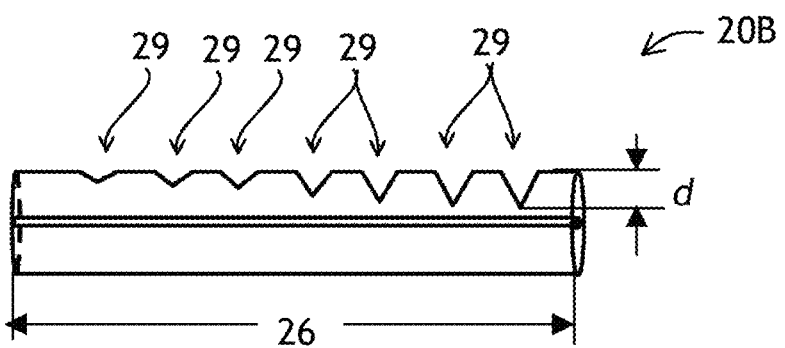
Figure 14A:
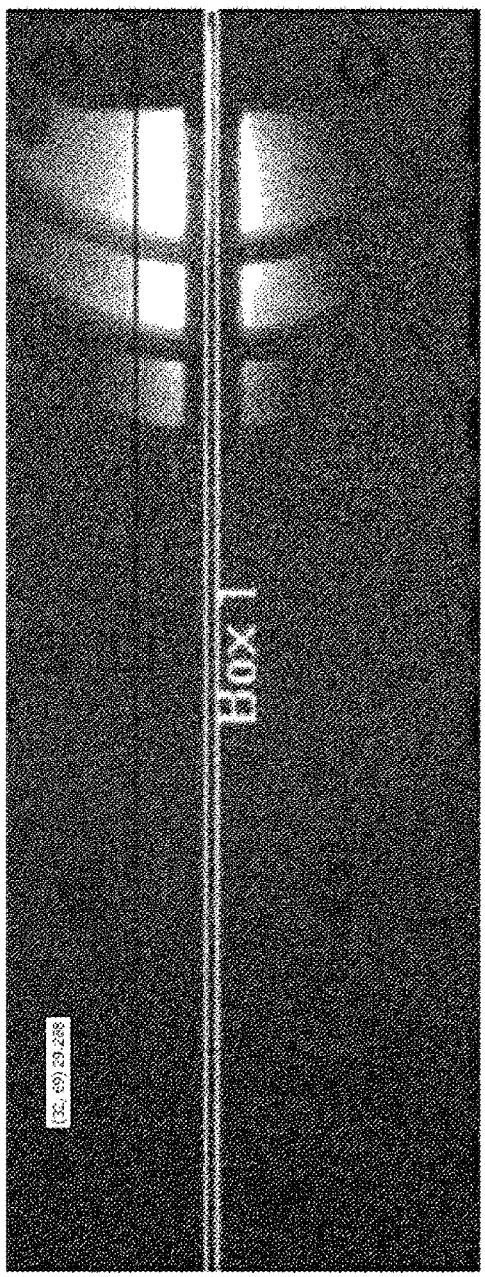
FIG. 14A is a measured surface temperature distribution of a cladding mode stripper prototype having a constant notch pitch and depth.
Figure 14B:
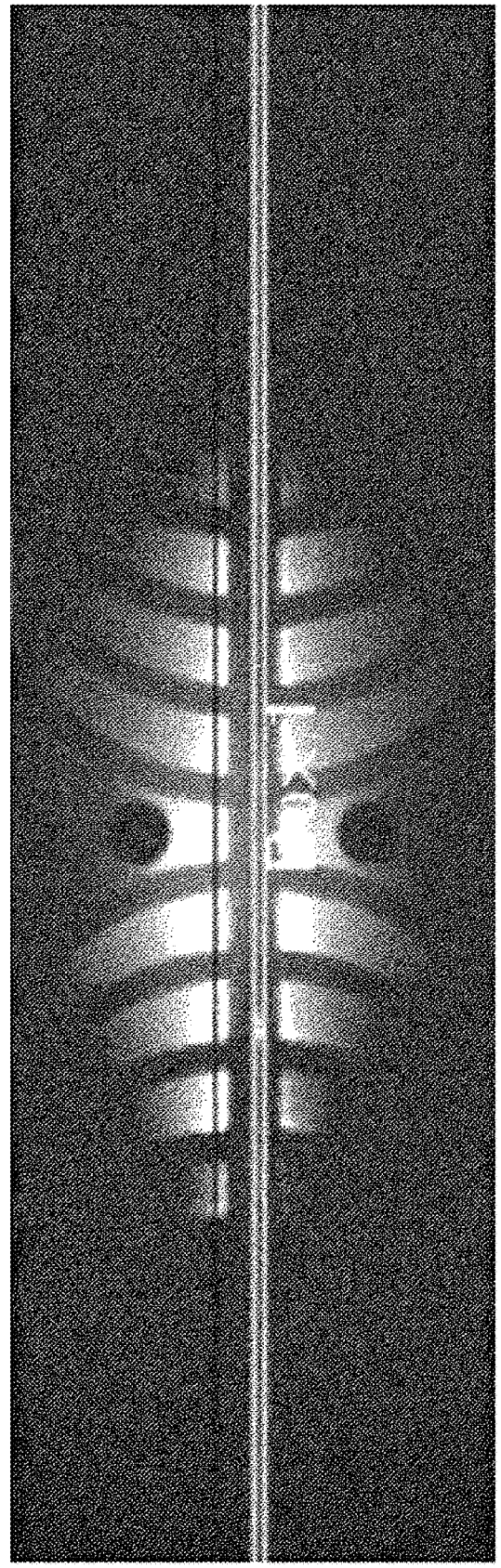
FIG. 14B is a measured surface temperature distribution of a cladding mode stripper prototype having a varying notch pitch and depth.

Two prototype cladding light strippers were built to demonstrate the capability of the cladding light strippers 20 of FIG. 2A, 20A of FIGS. 12, and 20B of FIG. 13 to even out the heat distribution due to the stripped cladding light 30A, 30B. Referring to FIG. 14A, a heat distribution in the heat sink 34 at a constant notch 29 depth d and spacing (pitch) is shown. One can see that most of the heat is dissipated at the beginning at the left-hand side of the heat sink 34. This type of heat distribution is also common in prior-art cladding light strippers, where the strip rate is constant along the device. Turning now to FIG. 14B, a heat distribution in the heat sink 34 at a varying notch 29 depth d and spacing (pitch) is shown. The temperature profile of the heat sink 34 is more even, indicating a more distributed heat load along the heat sink 34. The benefit of the varying notch 29 size and spacing can be quantified by temperature increase of the heat sink 34. For the prototype device of FIG. 14B, the temperature increase on the heat sink is only 34 degrees C. for total stripped power of approximately 450 W, which is only half of the temperature increase for the non-distributed heat load cladding mode stripping (FIG. 14A) at the same stripped power level of approximately 450 W.

Figure 15:
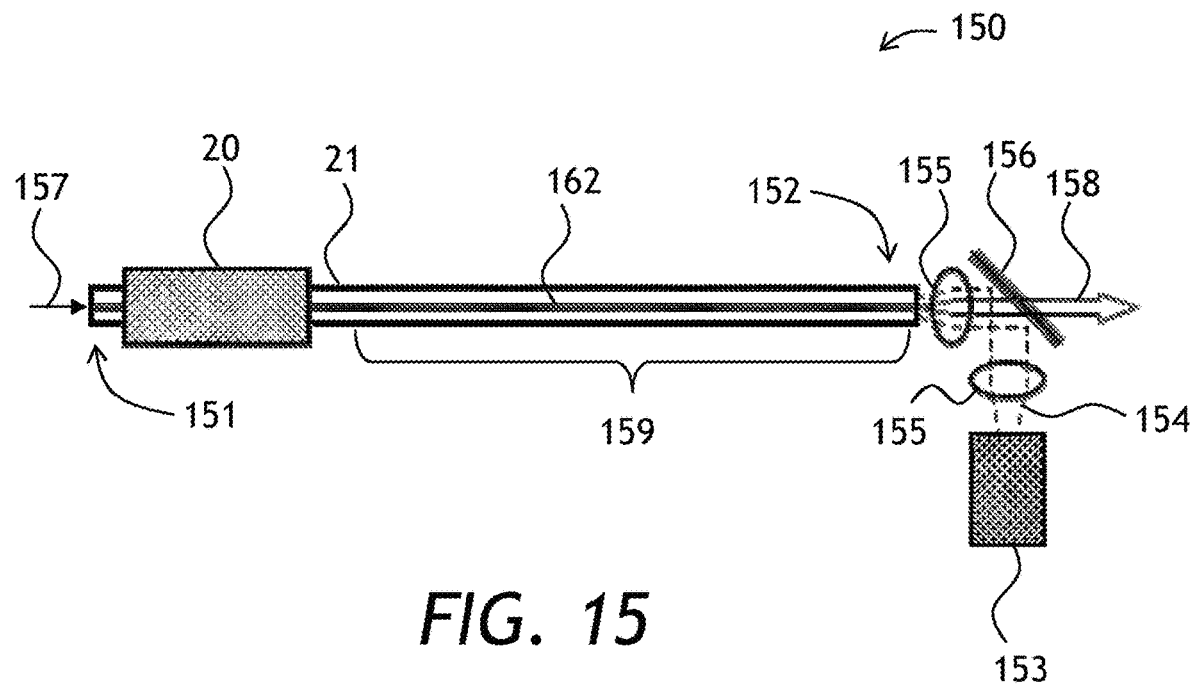
FIG. 15 is a schematic view of an optical fiber amplifier including a cladding light stripper of the invention.

Applications of the cladding light stripper 20 of FIG. 2A will now be considered. Referring to FIG. 15, an optical fiber amplifier 150 includes the cladding light stripper 20 and an amplifier double clad optical fiber portion 159, which is coupled to the double clad optical fiber 21 of the cladding light stripper 20 at a first end 151 of the amplifier double clad optical fiber portion 159. A pump diode 153 is optically coupled e.g. via lenses 155 and a dichroic mirror 156, to a second opposing end 152 of the amplifier double clad optical fiber portion 159. In operation, the pump diode 153 generates pump light 154 shown in dashed lines, which is coupled to the amplifier double clad optical fiber portion 159 for propagation from the second end 152 to the first end 151 of the amplifier double clad optical fiber portion 159. The dichroic mirror 156 reflects light at the pump wavelength, but transmits light at the signal wavelength. When the pump light 154 is absorbed in a doped core 162 of the amplifier double clad optical fiber portion 159, an input optical signal 157 is amplified, and an output optical signal 158 shown in solid lines, or a laser light 158, exits the amplifier via the dichroic mirror 156. The cladding light stripper 20 removes most of the residual pump light 154 that has not been absorbed in the doped core 162 of the amplifier double clad optical fiber portion 159.

The cladding light stripper 20 can include, for example, an undoped double clad fiber section spliced to the amplifier double clad optical fiber portion 159, or it can include another portion of a same active (doped) double clad optical fiber that includes the amplifier double clad optical fiber portion 159. In one embodiment of the invention, the cladding light stripper 20 can have a light stripping efficiency of at least 15 dB at residual optical power levels of the pump diode 153 of at least 200 W.

Figure 16:
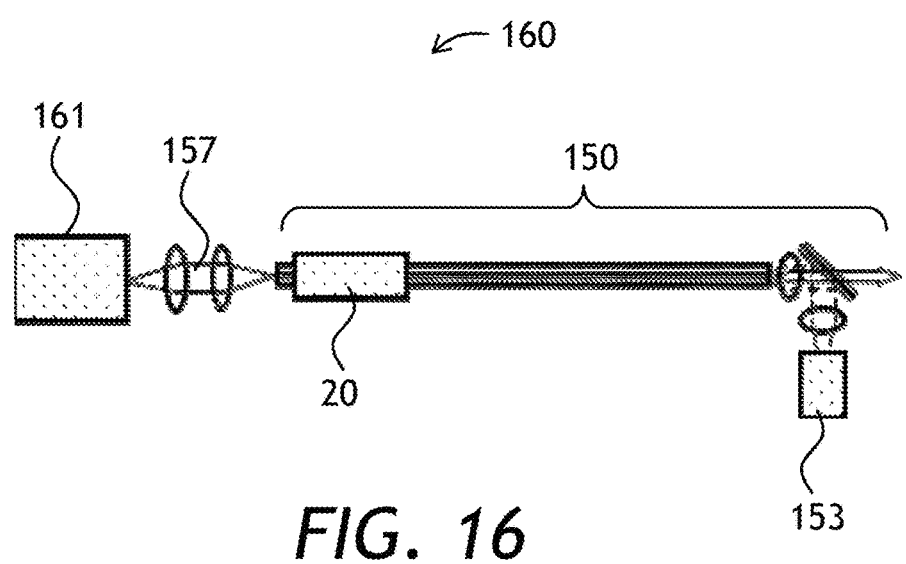
FIG. 16 is a schematic view of a fiber laser including the optical fiber amplifier of FIG. 15.

Turning to FIG. 16 with further reference to FIG. 15, a fiber laser 160 includes the optical fiber amplifier 150 and an oscillator 161 optically coupled to the optical fiber amplifier 150 for generating the input optical signal 157. The function of the cladding light stripper 20 is to remove as much cladding light as possible from the inner cladding 24, to prevent overheating, damage, or de-stabilization of the oscillator 161.

The cladding light stripper 20 can also be used in various other configurations, for example (1) in a fiber amplifier, not shown, in which the propagation direction of the optical signal 157 is in the same direction as that of the pump, and the cladding light stripper 20 is disposed near the output end of the active fiber or in a passive delivery fiber spliced to the active fiber, thus stripping both pump and signal light in the cladding; (2) in a double-pass fiber amplifier, not shown, in which the optical signal 157 in the core is reflected so that the optical signal 157 passes twice through the active fiber; (3) in a fiber oscillator, not shown, formed by an active fiber and two reflectors, the cladding light stripper 20 being disposed at the opposite end of the oscillator from the pump; or (4) in an autonomous power-delivery fiber, not shown, that can be attached, for example, by pluggable connectors or by fiber splicing, to a laser system.

Figure 17:
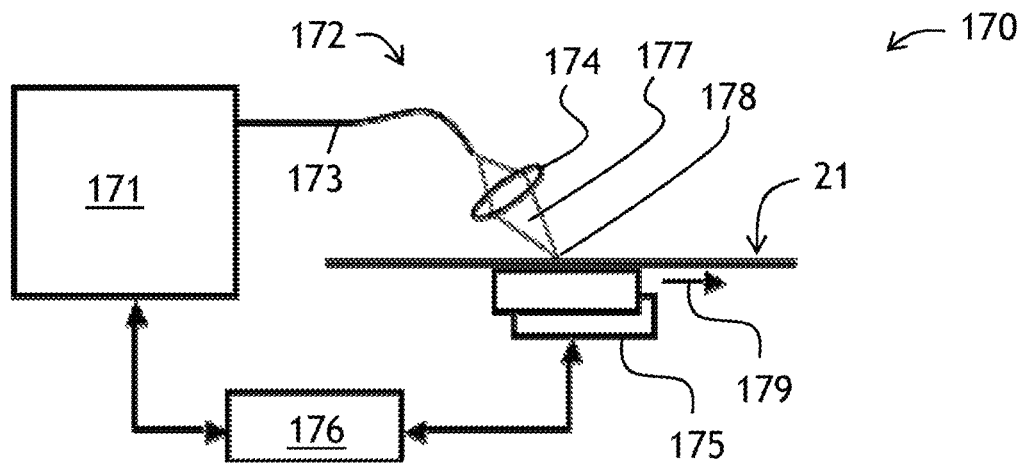
FIG. 17 is a schematic side view of a system for making notches on an optical fiber according to the invention.
Figure 18:
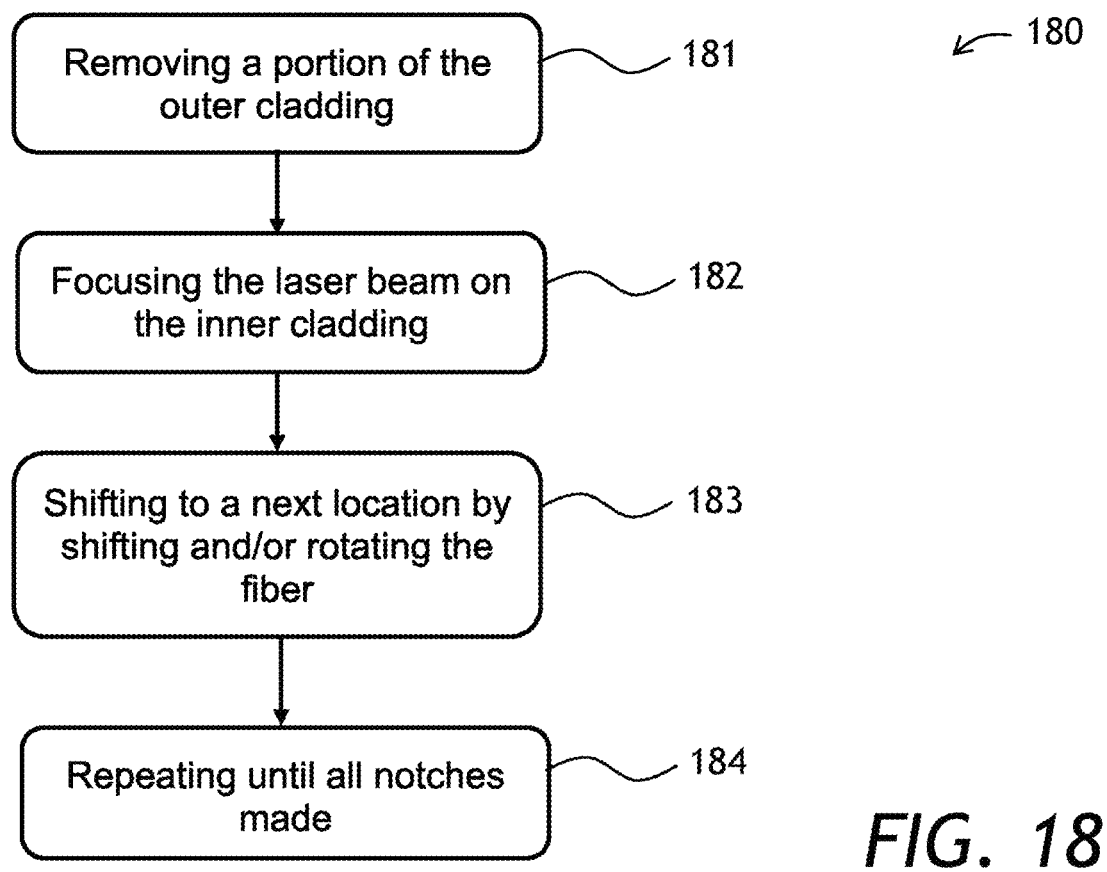
FIG. 18 is a flow chart of a method of manufacturing the cladding light stripper of FIG. 2A using the system of FIG. 17.

According to some aspects of the invention, the cladding light stripper 20 is preferably manufactured by laser-material ablation using a manufacturing system 170 shown in FIG. 17. The manufacturing system 170 includes a CO2 laser 171, a beam delivery system 172 including a delivery fiber 173 and a process head 174, a motorized translation/rotation stage 175, and a computer 176 configured for controlling the CO2 laser 171 and the translation/rotation stage 175. Referring to FIG. 18 with further reference to FIG. 2A and FIG. 17, a method 180 of manufacturing the cladding light stripper 20 includes a step 181 of removing the portion 26 of the outer cladding 25 leaving the section 27 of the outer surface 28 of the inner cladding 24 exposed. Then, in a step 182, the stripped fiber 21 is placed onto the motorized translation/rotation stage 175, and the process head 174 focuses an output laser beam 177 of the carbon dioxide (CO2) laser 171. The output laser beam 177 can be focused in a spherical or elliptical focal spot 178 on the outer surface 28 of the exposed section 27. To that end, the process head 174 can include a combination of spherical/meniscus and/or cylindrical lenses, not shown. The CO2 laser 171 is preferably operated in gated mode in tens to hundreds of microseconds, and the peak intensity of the focused laser beam is selected to be above the damage threshold of the inner cladding material, for example, between 100 kilowatts per square centimeter (kW/cm2) and 200 kW/cm2 for fused silica, depending on pulse duration. The focal spot 178 can be between 80 micrometers and 200 micrometers in size. The focal spot 178 can shaped, and/or the laser beam 177 can be angled, to produce a desired shape of the notch 29.

After one notch 29 is made by one or multiple shots of pulses, the laser beam 177 is focused on to the next position in a step 183, by moving either the fiber 21 as indicated by an arrow 179 using the translation/rotation stage 175, or the laser beam 177, to create consequent notches 29. Then, in a step 184, the focusing and ablating step 182 is repeated, the fiber 21 is shifted to a next position, and so on. The spacing between adjacent notches 29 can be identical or varying, controlled either manually or automatically via the computer 176 and the translation/rotation stage 175 to displace the optical fiber 21 lengthwise, to achieve desired stripping efficiency and/or heat load distribution as explained above. The width w and the depth d of the notches 29 is controlled by changing the CO2 laser 171 and/or focusing parameters (i.e., numbers of shots on each notch 29), peak power, laser pulse duration, laser temporal waveform, laser focus intensity, laser focal spot size, position of the fiber 21 relative to laser focal spot 178, or the like.

The manufacturing system 170 can be used to make the cladding light stripper 20 in any fiber even on an existing laser system, with no additional splice required. This is advantageous, because additional splices could further introduce core light loss and degradation in output laser beam quality.

The notches 29 can be made on one or multiple sides of the fiber 21 as shown in FIGS. 4A to 4D, by either rotating the fiber 21 using the translation/rotation stage 175, or using multiple laser beams, not shown. The number of sides where the notches 29 are made is dictated by the desired stripping efficiency and/or other requirements. Other laser types can be used to form the notches, for example UV lasers.

Referring back to FIGS. 2A and 2B with further reference to FIGS. 17 and 18, the cladding light stripper 20 manufactured using the CO2 manufacturing system 170 (FIG. 17) and the method 180 (FIG. 18) has been demonstrated to strip up to 500 W of the inner cladding light 33, with very low temperature coefficient for fused silica inner cladding 24, typically about 0.06° C. per one Watt (W) of removed optical power, and for polymer outer cladding 25, typically 0.03° C./W. A cladding light stripper 20 only 40 millimeters long can create about 19 dB of attenuation for low NA of less than 0.08 cladding light portions 30A, 30B, at the power level of 500 W. Typically, at least 16-23 dB stripping efficiency was achieved, with an occasional efficiency of up to 32 dB for low NA cladding light portions 30A, 30B of less than 0.08.

Another advantage of the cladding light stripper 20 is that even with extensive modifications on the surface 28 of the inner cladding 24, little or no degradation of the tensile strength of the optical fiber 21 was observed. All prototype devices had been tested with bending test and all passed equivalent tensile strength of 50 kilo pounds per square inch (kPSI). Furthermore, a packaged prototype cladding light stripper 20 has passed standard industrial 25 gravitational forces (G) shock test and 5 G sine sweep vibration test.

Since laser notching fabrication method 180 of FIG. 18 could introduce refractive index change on the core 22 of the optical fiber 21, it is possible that such device could introduce insertion loss or degradation in mode quality. One way to mitigate this effect is to lessen the depth d of the notches 29, or select a notch pitch that is different from a resonance frequency which will couple the fundamental mode of the signal light 23 into a higher order mode. These factors are preferably taken into consideration when selecting notch pitch. It has been experimentally confirmed that no loss in the core optical power or degradation in the mode quality was observed with prototypes of the cladding light strippers 20.

Figure 19:
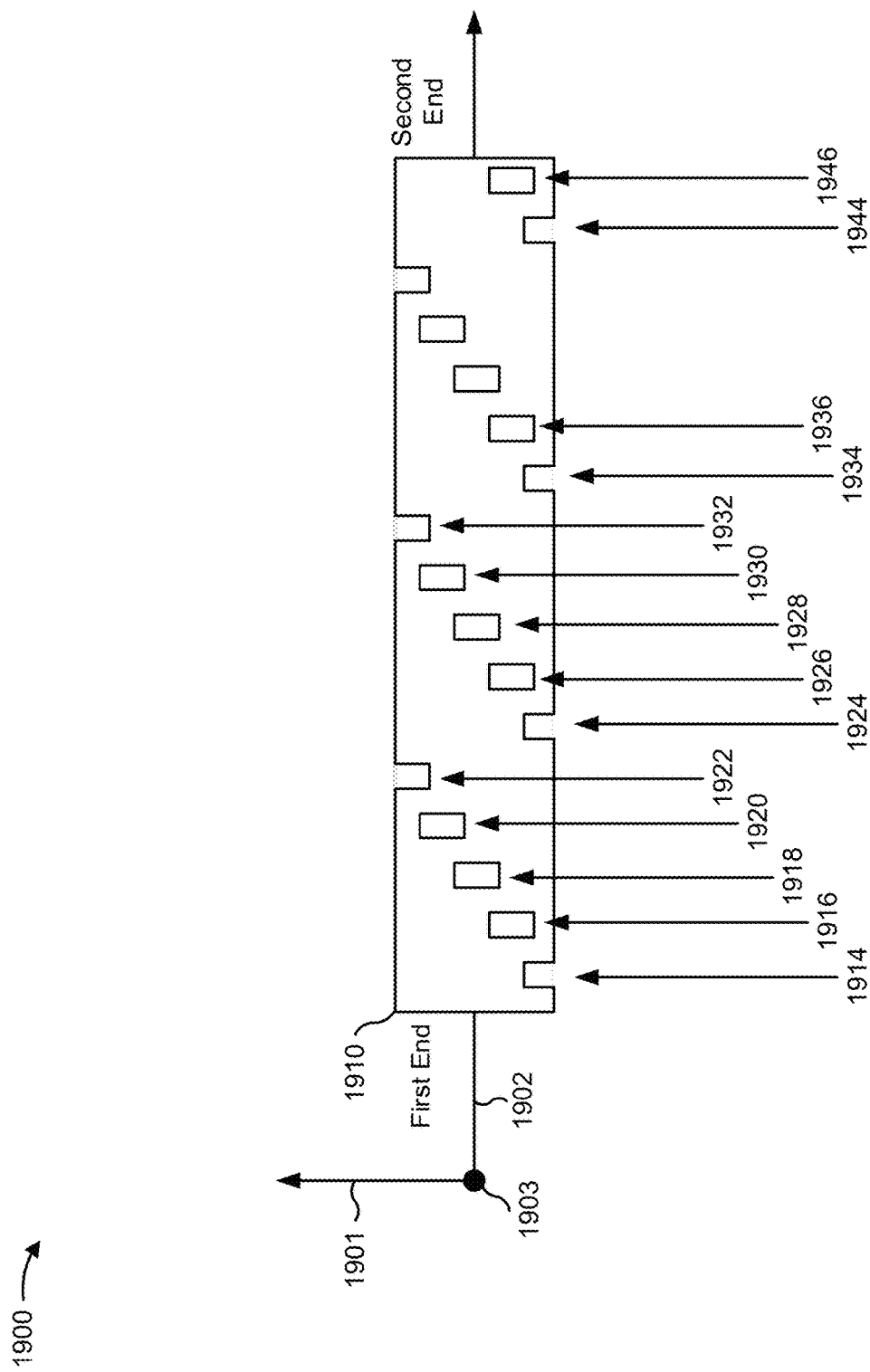
FIG. 19 is a diagram illustrating an example implementation of a cladding light stripper with spirally-arranged transversal notches.

FIG. 19 is a diagram of an example implementation 1900. FIG. 19 shows an example of a spirally arranged cladding light stripper. As shown in FIG. 19, the spirally arranged cladding light stripper may be described with regard to a set of axes 1901, 1902, and 1903, and with regard to a first end and a second end.

As shown in FIG. 19, a cladding light stripper 1910 includes a set of notches 1914-1946. In some implementations, notches 1914-1946 are transversal to cladding light stripper 1910 (i.e., transversal notches) to enable light to escape a cladding of cladding light stripper 1910. For example, notch 1914 represents a portion of a cladding layer that is removed from cladding light stripper 1910 secantial to cladding light stripper 1910. In other words, a surface of notch 1914 is associated with a plane displaced parallel to a plane tangent to a surface of cladding light stripper 1910. In some implementations, notches 1914-1946 may be perpendicular to axis 1902. For example, notch 1916 may extend parallel to axis 1901. Additionally, or alternatively, notches 1914-1946 may extend non-perpendicular to axis 1902. For example, a notch (e.g., notch 1916) may be angled with regard to axis 1901 and axis 1902. Further to the example, a set of notches may be arranged in a helical path (e.g., a path defined by an equation $x(t)=\cos(t)$, $y(t)=\sin(t)$, $z(t)=t$), such that each notch is formed by pulsing a laser to interrupt the helical path. In some implementations, the set of notches may be manufactured in an orientation at angle to the fiber (e.g., extending non-parallel to a tangent of a core of the fiber), such as by rotating a focusing lens during manufacture.

In some implementations, notches 1914-1946 are displaced longitudinally along axis 1902. For example, notch 1914 is at a first position on cladding light stripper 1910 a first distance from the first end and notch 1916 is at a second position on cladding light stripper 1910 a second distance from the first end. In this case, the second distance is greater than the first distance (e.g., notch 1916 is positioned farther along axis 1902 from the first end toward the second end of cladding light stripper 1910). In some implementations, notches 1914-1946 are displaced longitudinally such that a circumferential segment of cladding light stripper 1910 only includes a single notch. For example, notch 1914 may not overlap with any other notch with regard to a position on axis 1902. In some implementations, notches 1914-1946 are displaced angularly around axis 1902. For example, notch 1914 is at a first angular position on cladding light stripper 1910 and notch 1916 is at a second angular position on cladding light stripper 1910.

Based on displacing a second notch relative to a preceding first notch longitudinally, cladding light stripper 1910 may be associated with enabling light to escape a cladding layer of cladding light stripper 1910. Based on displacing the second notch relative to the preceding first notch angularly, cladding light stripper 1910 may be associated with improved mechanical durability relative to another type of cladding light stripper. Based on displacing multiple notches at a plurality of angular positions around the core, cladding light striper 1910 may be associated with improved heat dissipation efficiency. For example, scattering of light by the multiple notches may result in dissipation of energy into the cladding and from the cladding. In this case, based on displacing the multiple notches at a plurality of angular positions, the energy dissipation is distributed to the plurality of angular positions, thereby reducing an energy dissipation at each position on the cladding relative to another cladding light stripper with notches not angularly displaced. Although some implementations, described herein, may be described in terms of a spiral arrangement of transversal notches, other non-spiral arrangements are possible, such as a corkscrew arrangement, a curled arrangement, a helical arrangement, an offset arrangement, a partially offset arrangement, an irregular arrangement, another repeating pattern of angular displacements, another non-repeating pattern of angular displacements, a continuous arrangement (e.g., a single continuous notch in a spiral arrangement around the cladding light stripper for a portion of the length of the cladding light stripper), or the like.

As indicated above, FIG. 19 is provided merely as an example. Other examples are possible and may differ from what was described with regard to FIG. 19.

FIGS. 20A-20C are diagrams of an example implementation 2000. FIGS. 20A-20C show an example of manufacturing a cladding light stripper.

As shown in FIG. 20A, at a time R=1, a cladding light stripper 2010 is displaced in a direction 2020. As cladding light stripper 2010 is displaced in direction 2020, a first notch 2030-1 is fabricated using a fabricator (e.g., a pulsed laser, a cutter, or the like) to remove a portion of a cladding layer of cladding light stripper 2010. Cladding light stripper 2010 is displaced farther in direction 2020 along the axis, and a second notch 2030-2 is fabricated, a third notch 2030-3 is fabricated, a fourth notch 2030-4 is fabricated, or the like. In this case, each notch 2030 is disposed at a different longitudinal position of cladding light stripper 2010, but at a common first angular position of cladding light stripper 2010. In some implementations, a laser may be pulsed to cause discrete transversal notches to be fabricated at the different longitudinal positions. Size and/or orientation of the transversal notches can be controlled based on altering a pulse rate, a translational movement rate, a rotational movement rate, a relative orientation, a pulse width, a laser spot size, a laser intensity, or the like. For example, defocusing a laser may permit a tapered notch to be fabricated. In some implementations, the fabricator may be synchronized with a work bench to move the cladding light stripper and pulse the laser in synchronization to manufacture the notches for the cladding light stripper. Additionally, or alternatively, another method may be used to cause a set of notches to be fabricated as cladding light stripper is displaced in direction 2020.

As shown in FIG. 20B, at time R=2, cladding light stripper 2010 is rotated angularly to cause, for example, the fabricator to be directed toward a second angular position on cladding light stripper 2010. Based on cladding light stripper 2010 being displaced in direction 2020, another set of notches 2040-1 through 2040-4 are fabricated at the second angular position. Based on the second angular position being different from the first angular position, notches 2040 are displaced angularly relative to notches 2030. In some implementations, a laser may be pulsed to fabricate notches 2040 at different longitudinal positions from corresponding notches 2030. In other words, notch 2040-1 is displaced longitudinally from notch 2030-1.

As shown in FIG. 20C, at time R=3, cladding light stripper 2010 is rotated to cause the fabricator to be directed toward a third angular position on cladding light stripper 2010. Based on cladding light stripper 2010 being displaced in direction 2020, another set of notches 2050-1 (not shown) through 2050-4 are fabricated at the third angular position. Based on the third angular position being different from the first angular position and the second angular position, notches 2050 are displaced at a different angular position relative to notches 2030 and notches 2040. In some implementations, a laser may be pulsed to fabricate notches 2050 at different longitudinal positions from corresponding notches 2030 and notches 2040. In other words, notch 2050-2 is displaced longitudinally from notch 2030-2 and notch 2040-2. For example, notch 2040-4 is fabricated such that the notch immediately preceding notch 2040-4 longitudinally (e.g., notch 2030-4) and the notch immediately succeeding notch 2040-4 longitudinally (e.g., notch 2050-4) are each displaced laterally relative to notch 2040-4.

In this way, notches may be fabricated in a spiral arrangement for cladding light stripper 2010. Based on fabricating sets of notches (e.g., a first set of notches at a first angular position, a second set of notches at a second angular position, etc.), cladding light stripper 2010 can be manufactured using a same process as another cladding light stripper that does not include a spiral arrangement of transversal notches, thereby reducing a difficult of manufacture.

As indicated above, FIGS. 20A-20C are provided merely as an example. Other examples are possible and may differ from what was described with regard to FIGS. 20A-20C.

FIGS. 21A-21C are diagrams of an example implementation 2100. FIGS. 21A-21C show another example of a manufacturing a cladding light stripper.

As shown in FIG. 21A, at time T=1, a cladding light stripper 2110 is exposed to a fabricator (e.g., a pulsed laser, a cutter, or the like) to fabricate a notch 2030-1 for cladding light stripper 2110.

As shown in FIG. 21B, at time T=2, cladding light stripper 2110 is rotated in a direction 2120-1 and displaced longitudinally in a direction 2120-2 to cause the fabricator to be directed toward another angular position and another longitudinal position on cladding light stripper 2110. Based on cladding light stripper 2110 being displaced both angularly in direction 2120-1 and longitudinally in direction 2120-2, notch 2140 is fabricated at a different angular position and a different longitudinal position relative to notch 2130.

As shown in FIG. 21C, at time T=3, cladding light stripper 2110 is rotated in direction 2120-1 and displaced longitudinally in direction 2120-2 to cause the fabricator to be directed toward another angular position and another longitudinal position on cladding light stripper 2110. Based on cladding light stripper 2110 being displaced both angularly in direction 2120-1 and longitudinally in direction 2120-2, notch 2150 is fabricated at a different angular position and longitudinal position relative to notch 2130 and notch 2140. In this way, notches are fabricated in a spiral arrangement for cladding light stripper 2110. Based on rotating cladding light stripper 2110 and displacing cladding light stripper longitudinally, notches can be fabricated for cladding light stripper in a single continuous run (e.g., without removing cladding light stripper 2110 from a fabricator after fabrication of a first set of notches to rotate cladding light stripper 2110 for another run to fabricate a second set of notches). In some implementations, cladding light stripper 2110 may be rotated and displaced longitudinally without pulsing a laser cutter, thereby cutting a single (or multiple discrete) spiral notches with the single spiral notch (or multiple discrete spiral notches each) extending circumferentially (e.g., completely circumferentially or partially circumferentially) around cladding light stripper 2110 and extending from a first longitudinal position to a second longitudinal position.

As indicated above, FIGS. 21A-21C are provided merely as an example. Other examples are possible and may differ from what was described with regard to FIGS. 21A-21C.

Although some implementations, described herein, are described in terms of displacing a cladding light stripper relative to a fabricator (e.g., a laser, a cutter, or the like) to fabricate a set of notches for the cladding light stripper, other manufacturing processes may be possible. For example, a fabricator (e.g., a laser) may be displaced relative to the cladding light stripper to fabricate the set of notches for the cladding light stripper. Additionally, or alternatively, multiple fabricators may be positioned to concurrently fabricate multiple transversal notches at different longitudinal positions, different angular positions, or the like.

Figure 22:
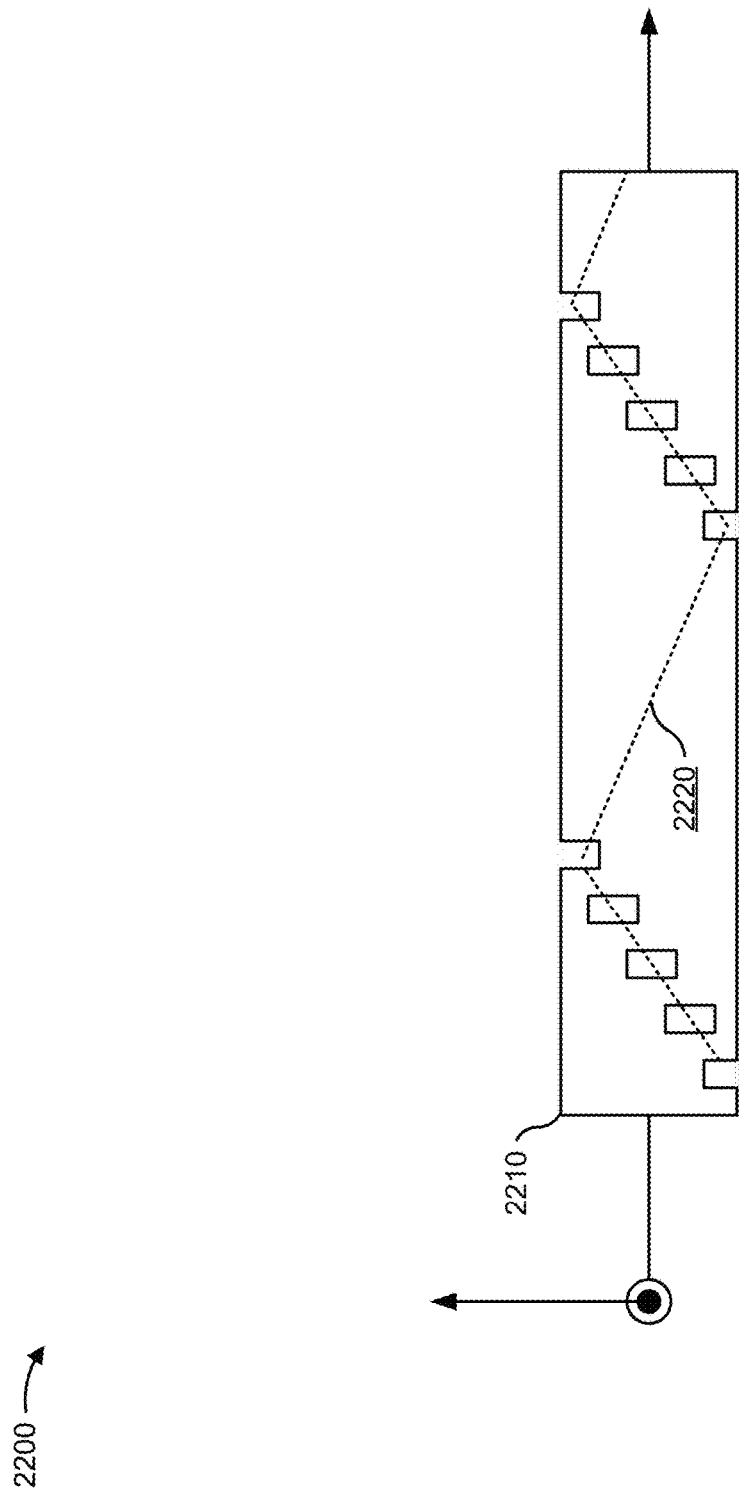
FIG. 22 is a diagram illustrating another example implementation of a cladding light stripper with spirally-arranged transversal notches.

FIG. 22 is a diagram of an example implementation 2200. FIG. 22 shows an example of a cladding light stripper with a single spiral of notches.

As shown in FIG. 22, a cladding light stripper 2210 may include a set of notches arranged in a spiral arrangement 2220. In this case, spiral arrangement 2220 may include a set of notches with each notch displaced longitudinally from each other notch. In some implementations, spiral arrangement 2220 may include a set of notches with each notch partially displaced longitudinally from each other notch. For example, a first notch and a second notch may partially overlap in a longitudinal axis, but may be disposed at different angular positions. Similarly, spiral arrangement 220 may include a set of notches with each notch partially displaced angularly from each other notch. For example, a first notch and a second notch may partially overlap in angular position, but may be disposed at different longitudinal positions.

As indicated above, FIG. 22 is provided merely as an example. Other examples are possible and may differ from what was described with regard to FIG. 22.

Figure 23:
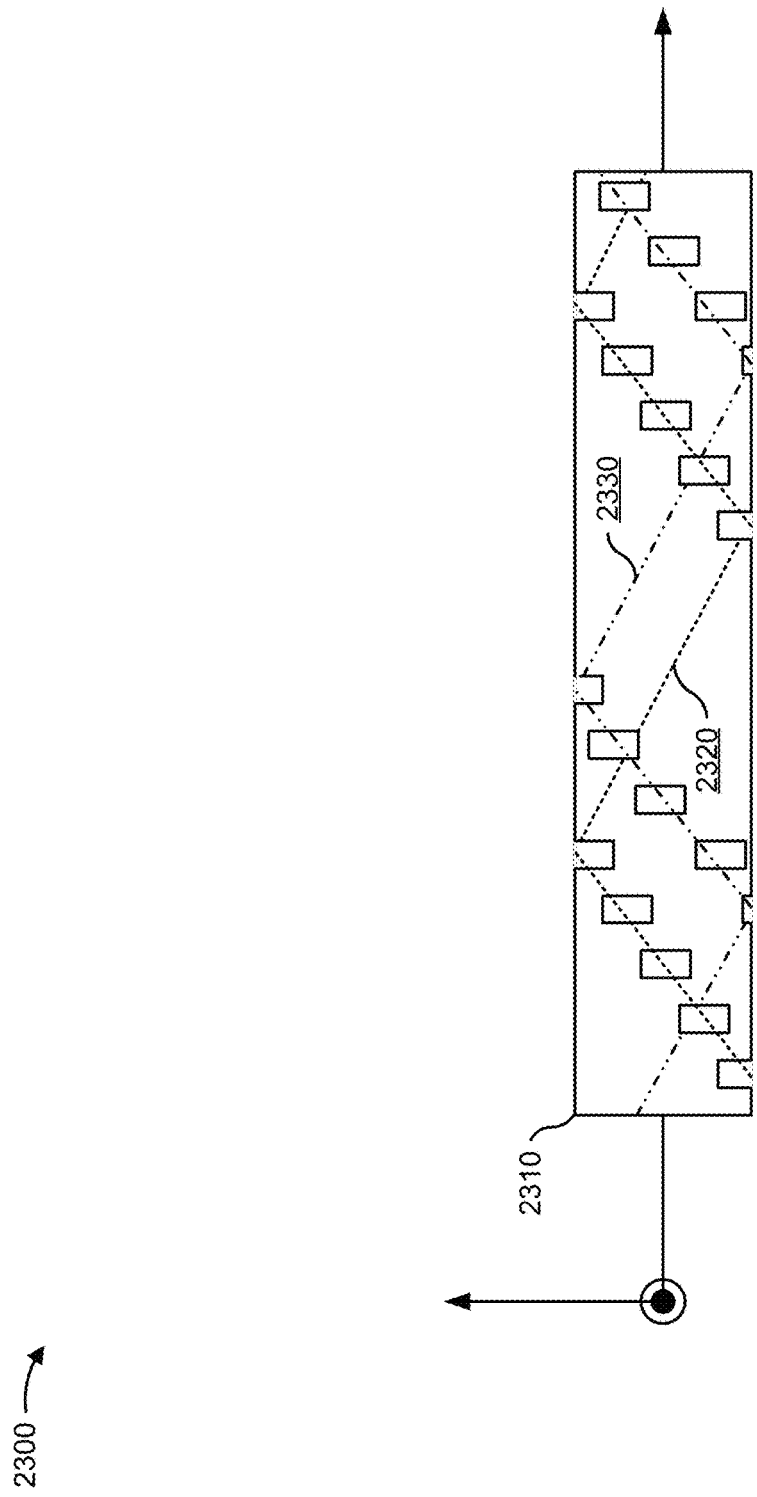
FIG. 23 is a diagram illustrating another example implementation of a cladding light stripper with spirally-arranged transversal notches.

FIG. 23 is a diagram of an example implementation 2300. FIG. 23 shows an example of a cladding light stripper with a set of two spirals of notches.

As shown in FIG. 23, a cladding light stripper 2310 may include a first set of notches arranged in a spiral arrangement 2320 and a second set of notches arranged in a spiral arrangement 2330. In this case, spiral arrangement 2320 may include a set of notches with each notch displaced longitudinally from each other notch of spiral arrangement 2320. Similarly, spiral arrangement 2330 may include a second set of notches with each notch displaced longitudinally from each other notch of spiral arrangement 2330. In some implementations, notches of spiral arrangement 2320 and notches of spiral arrangement 2330 may share a common longitudinal position on cladding light stripper 2310. For example, a first notch of spiral arrangement 2320 and a second notch of spiral arrangement 2330 may share a common longitudinal position and may be displaced at different angular positions on cladding light stripper 2310. In some implementations, notches of spiral arrangement 2320 and notches of spiral arrangement 2330 may partially share a common longitudinal position. For example, the first notch and the second notch may partially overlap in longitudinal positions. In some implementations, notches of spiral arrangement 2320 and notches of spiral arrangement 2330 may not overlap in longitudinal position. In some implementations, some notches of spiral arrangement 2320 may at least partially overlap with notches of spiral arrangement 2330 and other notches of spiral arrangement 2320 may not at least partially overlap with notches of spiral arrangement 2330.

As indicated above, FIG. 23 is provided merely as an example. Other examples are possible and may differ from what was described with regard to FIG. 23.

Figure 24:
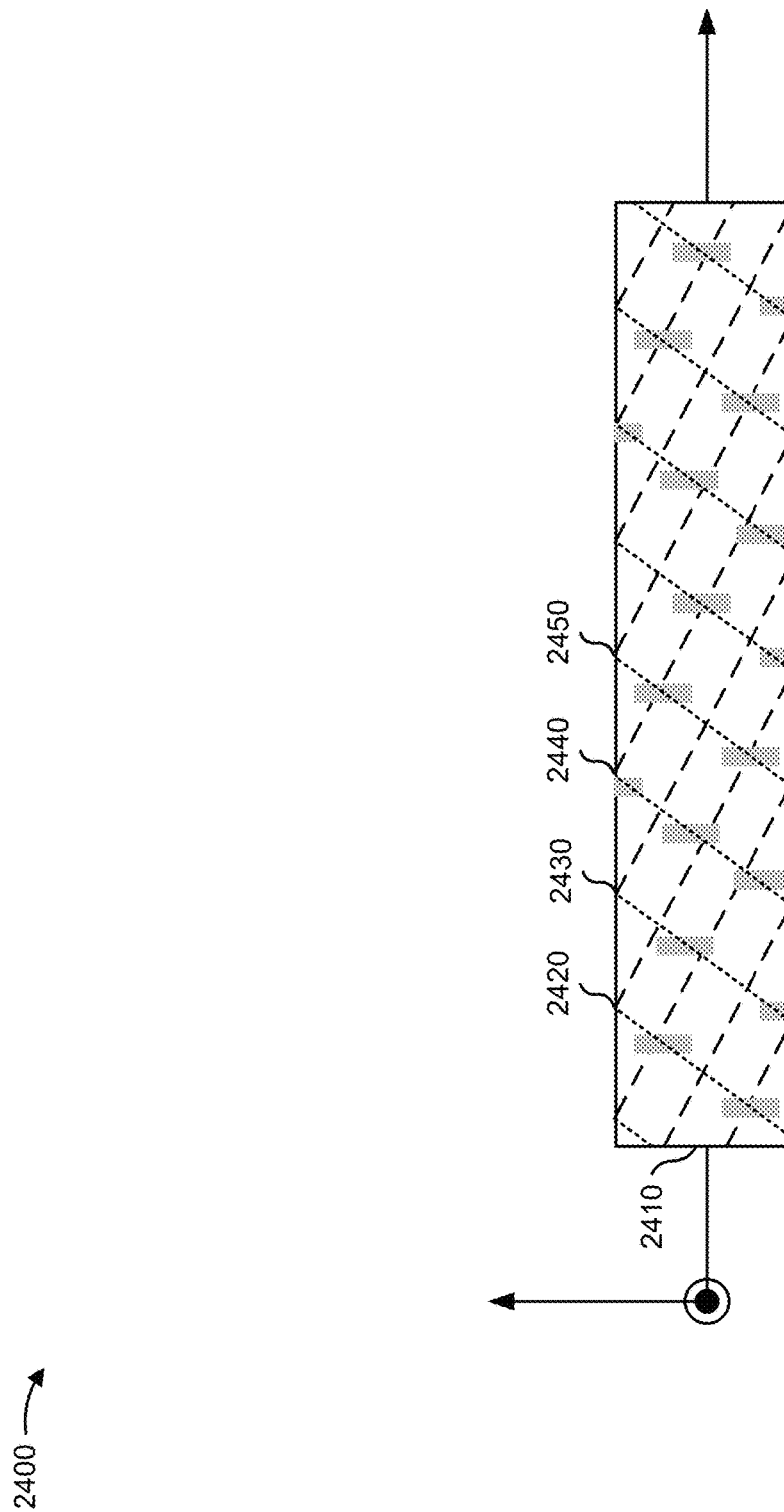
FIG. 24 is a diagram illustrating another example implementation of a cladding light stripper with spirally-arranged transversal notches.

FIG. 24 is a diagram of an example implementation 2400. FIG. 24 show an example of a cladding light stripper with a multiple spirals of notches.

As shown in FIG. 24, a cladding light stripper 2410 may include multiple sets of notches arranged in spiral arrangements 2420, 2430, 2440, and 2450. In some implementations, one or more notches of each set of notches may overlap angularly with notches of the other sets of notches.

As indicated above, FIG. 24 is provided merely as an example. Other examples are possible and may differ from what was described with regard to FIG. 24.

FIGS. 25A-25D are diagrams of example cladding light strippers with one or more cladding layers.

Figure 25A:
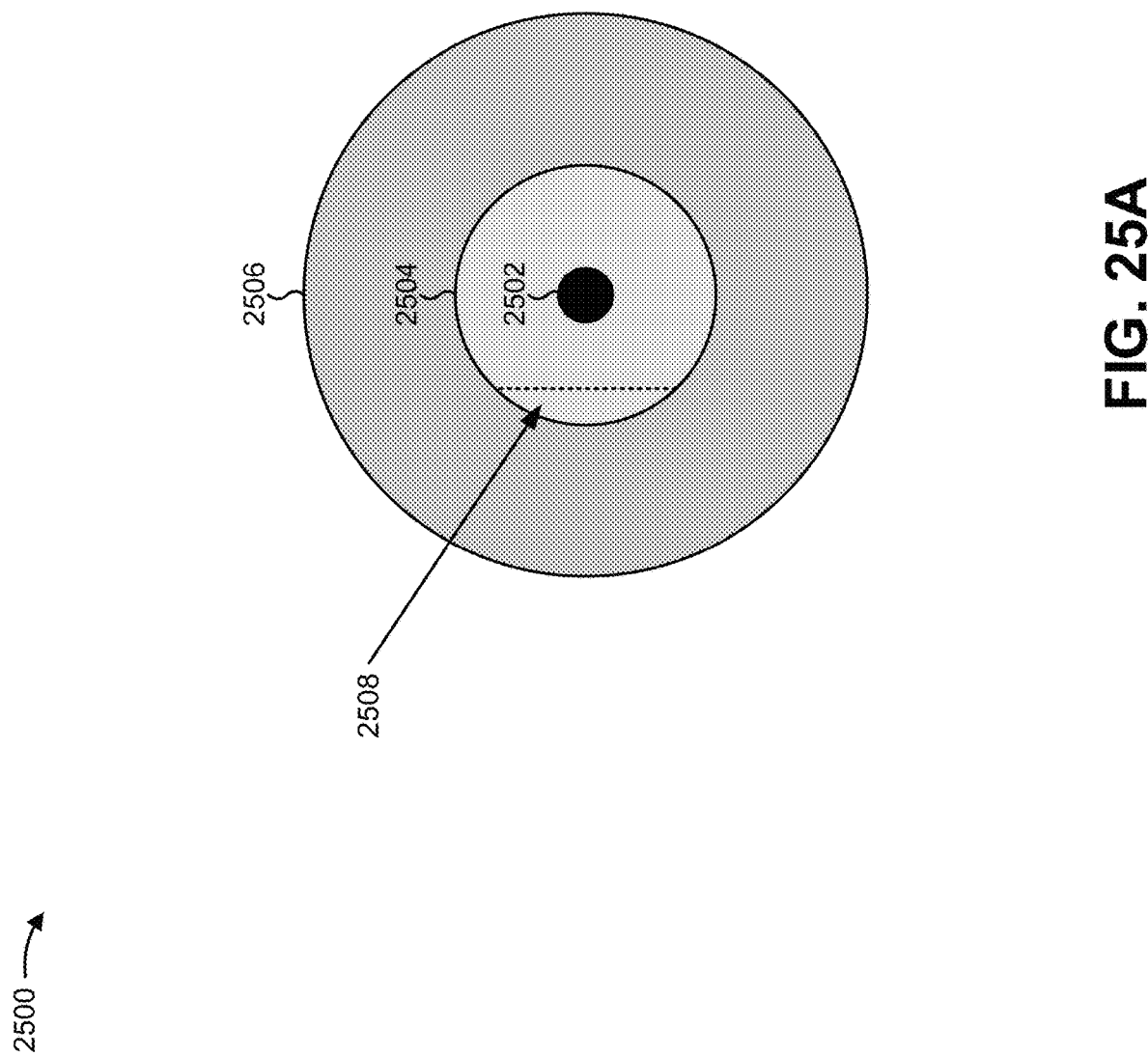
FIGS. 25A-25D are diagrams illustrating example implementations of a set of cladding light strippers.

As shown in FIG. 25A, in a cross-sectional view, a first cladding light stripper 2500 includes an inner core 2502, a cladding layer 2504, and a coating layer 2506. First cladding light stripper 2500 is a single-clad optical fiber. In some implementations, inner core 2502 may be a glass core with a first refractive index $n_0$. In some implementations, cladding layer 2504 may be a glass cladding layer with a second refractive index $n_1$, such that $n_1$ is less than $n_0$. In some implementations, coating layer 2506 may be a polymer coating with a refractive index $n_H$, such that $n_H$ is greater than $n_1$. In this case, coating layer 2506 may be termed a high-index polymer coating. As shown by reference number 2508, a notch may be fabricated, such that the notch extends secantially from a first position at an interface of cladding layer 2504 and coating layer 2506 though cladding layer 2504 to a second position at the interface of cladding layer 2504 and coating layer 2506. In this case, a portion of cladding layer 2504 is removed to form an exposed section of cladding layer 2504 and fabricate the notch and the notch extends only a partial distance toward inner core 2502.

Figure 25B:
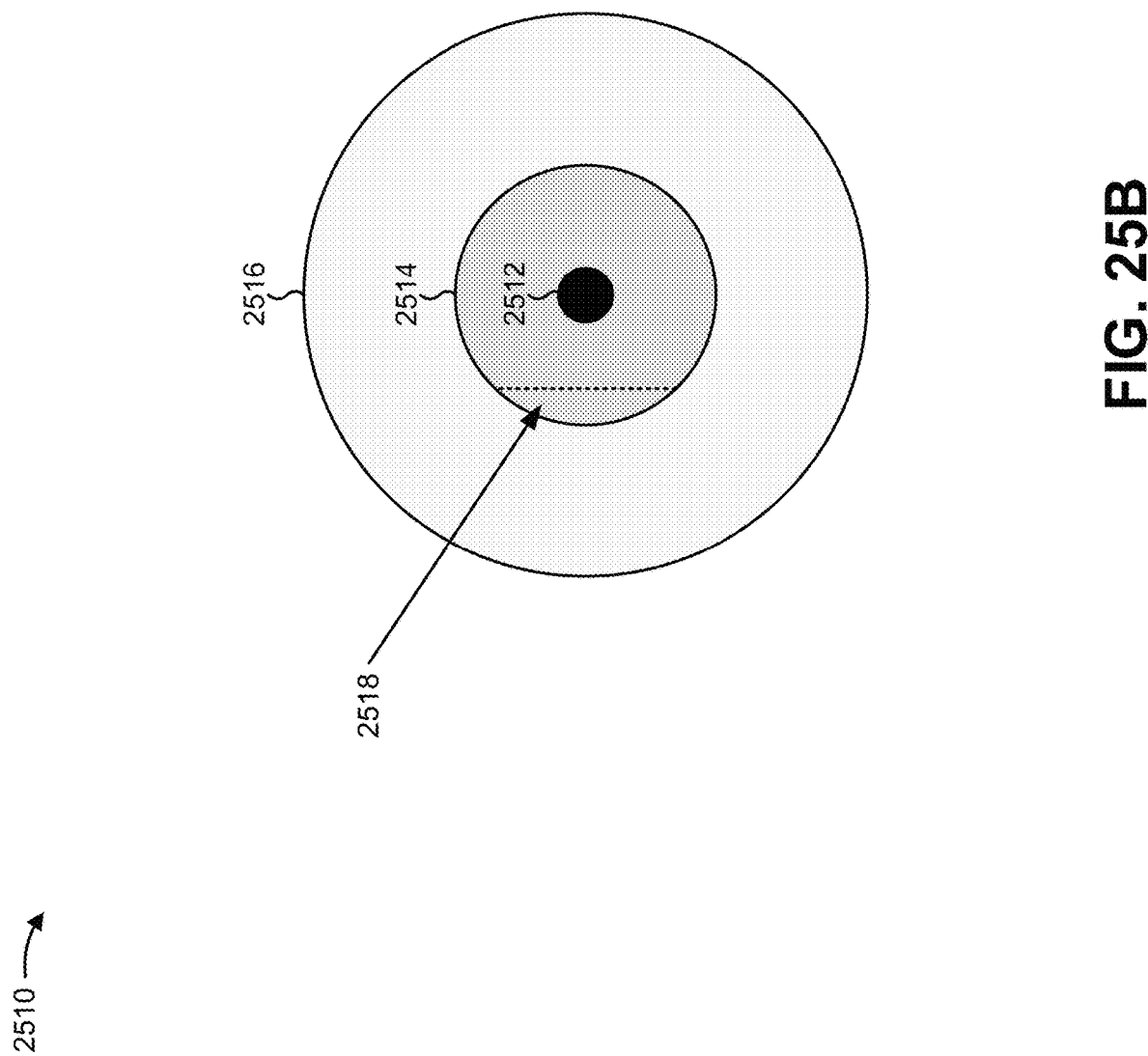

As shown in FIG. 25B, in a cross-sectional view, a second cladding light stripper 2510 includes an inner core 2512, a cladding layer 2514, and a coating layer 2516. In some implementations, inner core 2512 may be a glass core with a first refractive index $n_0$. In some implementations, cladding layer 2514 may be a glass cladding layer with a second refractive index $n_1$, such that $n_1$ is less than $n_0$. In some implementations, coating layer 2516 may be a polymer coating with a refractive index $n_L$, such that $n_L$ is less than $n_1$. In this case, coating layer 2516 may be termed a low-index polymer coating. As shown by reference number 2518, a notch may be fabricated, such that the notch extends secantially from a first position at an interface of cladding layer 2514 and coating layer 2516 though cladding layer 2514 to a second position at the interface of cladding layer 2514 and coating layer 2516. In this case, a portion of cladding layer 2514 is removed to fabricate the notch.

Figure 25C:
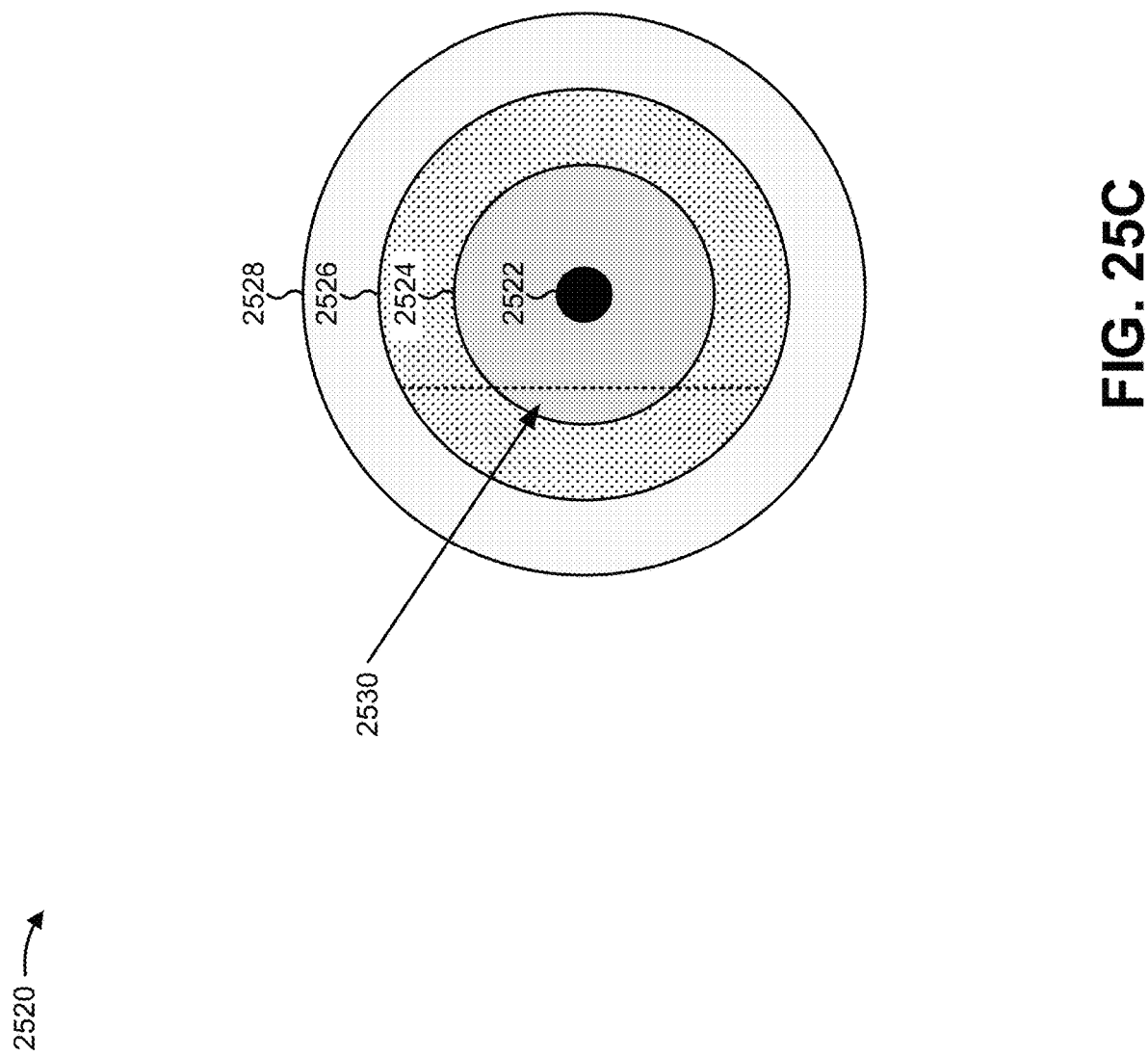

As shown in FIG. 25C, in a cross-sectional view, a third cladding light stripper 2520 includes an inner core 2522, an inner cladding layer 2524, an outer cladding layer 2526, and a coating layer 2528. In some implementations, inner core 2522 may be a glass core with a first refractive index $n_0$. In some implementations, inner cladding layer 2524 may be a glass cladding layer with a second refractive index $n_1$, such that $n_1$ is less than $n_0$. In some implementations, outer cladding layer 2526 may be a glass cladding layer with a third refractive index $n_2$, such that $n_2$ is less than $n_1$. In some implementations, coating layer 2528 may be a low-index polymer coating with a refractive index $n_L$, such that $n_L$ is less than $n_2$. In another example, coating layer 2528 may be associated with a refractive index greater than or equal to $n_2$, greater than or equal to $n_1$, or the like. As shown by reference number 2530, a notch may be fabricated, such that the notch extends from a first position at an interface of outer cladding layer 2526 and coating layer 2528 though outer cladding layer 2526 and through inner cladding layer 2524 to a second position at the interface of outer cladding layer 2526 and coating layer 2528. In this case, a portion of outer cladding layer 2526 and a portion of inner cladding layer 2524 are removed to fabricate the notch.

Figure 25D:
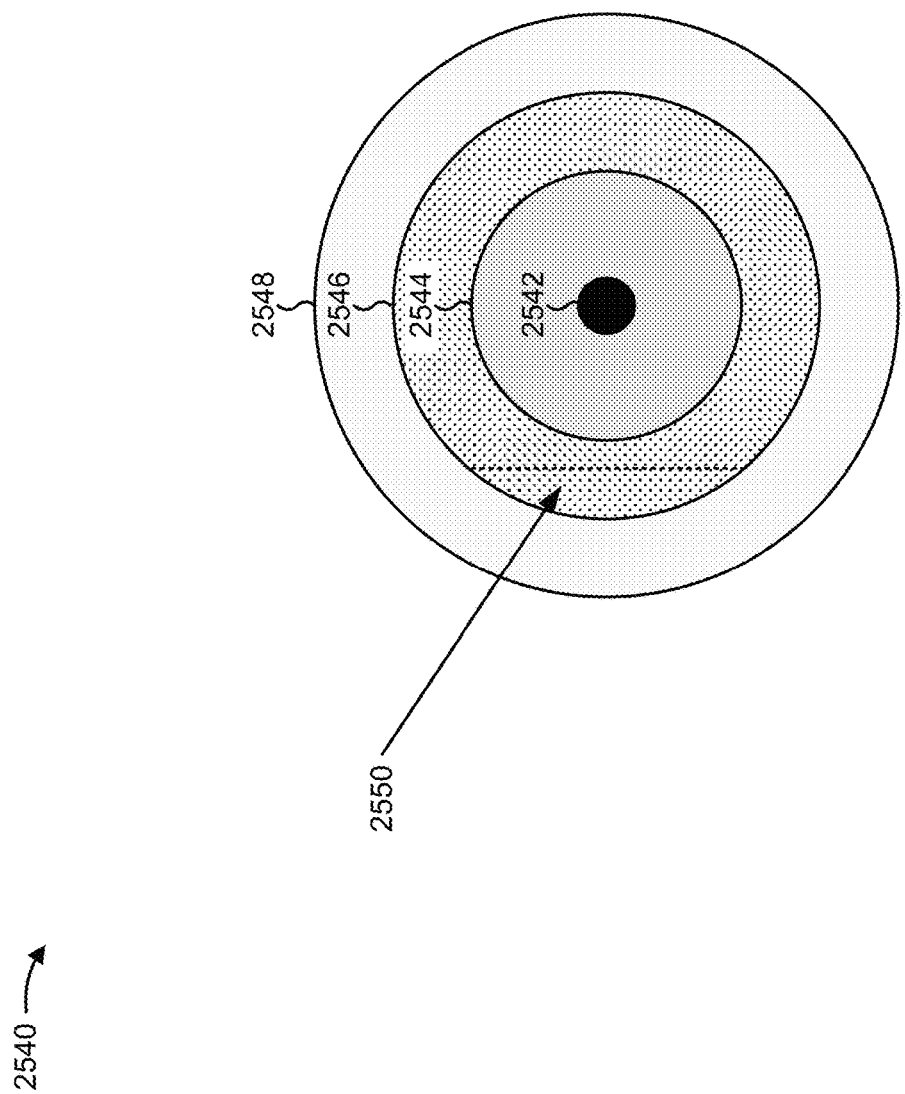

As shown in FIG. 25D, in a cross-sectional view, a fourth cladding light stripper 2540 includes an inner core 2542, an inner cladding layer 2544, an outer cladding layer 2546, and a coating layer 2548. Fourth cladding light stripper 2540 is a double-clad optical fiber. In another example, another quantity of cladding layers may be used for fourth cladding light stripper 2540, such as three or more cladding layers. In some implementations, inner core 2542 may be a glass core with a first refractive index $n_0$. In some implementations, inner cladding layer 2544 may be a glass cladding layer with a second refractive index $n_1$, such that $n_1$ is less than $n_1$. In some implementations, outer cladding layer 2546 may be a glass cladding layer with a third refractive index $n_2$, such that $n_2$ is less than $n_1$. In some implementations, coating layer 2548 may be a low-index polymer coating with a refractive index $n_L$, such that $n_L$ is less than $n_2$. In another example, coating layer 2548 may be associated with a refractive index greater than or equal to $n_2$, greater than or equal to $n_1$, or the like. As shown by reference number 2550, a notch may be fabricated, such that the notch extends from a first position at an interface of outer cladding layer 2546 and coating layer 2548 though outer cladding layer 2526 to a second position at the interface of outer cladding layer 2546 and coating layer 2548. In this case, a portion of outer cladding layer 2526 is removed to fabricate the notch, and any portion of inner cladding 2524 is not removed to fabricate the notch. In some implementations, the notch 2550 may be tangential to the first cladding layer 2544. In some implementations, the notch 2550 may extend through coating layer 2548. In some implementations, coating layer 2548 may be added after notch 2550 is formed. In some implementations, notch 2550 may be formed through coating layer 2548 (e.g., using a laser focuses through the coating layer to form the notch 2550 without altering the coating layer 2548).

As indicated above, FIGS. 25A-25D are provided merely as an example. Other examples are possible and may differ from what was described with regard to FIGS. 25A-25D. In some implementations, a cross-section of a notch is not a straight line secantial to the core as illustrated in FIGS. 25A-25D, but may be a curved line, an angled line, or an irregular line.

The foregoing disclosure provides illustration and description, but is not intended to be exhaustive or to limit the implementations to the precise form disclosed. Modifications and variations are possible in light of the above disclosure or may be acquired from practice of the implementations.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items, and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A cladding light stripper, comprising:
   an optical fiber having a core for guiding signal light and a cladding surrounding the core,
   the cladding including a set of notches;
   each notch in the set of notches having a depth into the cladding of only a partial distance to the core; and
   notches, in the set of notches, being disposed relative to each other longitudinally along the optical fiber and angularly around the core to enable light to escape the cladding upon impinging on a notch.

2. The cladding light stripper of claim 1, wherein the notches, in the set of notches, are associated with a depth toward the core of the optical fiber of between 5% and 20% of a diameter of the optical fiber.

3. The cladding light stripper of claim 1, wherein a pitch for adjacent notches in the set of notches, is between 400 micrometers and 1800 micrometers.

4. The cladding light stripper of claim 1, where the optical fiber is a double-clad optical fiber.

5. The cladding light stripper of claim 1, where the cladding includes three or more cladding layers.

6. The cladding light stripper of claim 1, where the notches, in the set of notches, are spirally-arranged.

7. The cladding light stripper of claim 1, where the notches, in the set of notches, are angularly displaced in a repeating pattern of angular displacements.

8. The cladding light stripper of claim 1, where at least one notch, in the set of notches, extends from a first position at an interface of the cladding and a coating layer through the cladding to a second position at the interface of cladding and the coating layer.

9. The cladding light stripper of claim 1, where the set of notches includes at least one spirally arranged notch extending circumferentially around the optical fiber and longitudinally from a first longitudinal position to a second longitudinal position.

10. The cladding light stripper of claim 1, where the set of notches is arranged in a first spiral pattern; and
    further comprising another set of notches arranged in a second spiral pattern,
    notches of the first spiral pattern being displaced relative to notches of the second spiral pattern.

11. A cladding light stripper, comprising:
    a double-clad optical fiber having a core for guiding signal light, an inner cladding surrounding the core, and an outer cladding surrounding the inner cladding,
    the double-clad optical fiber including a stripped portion where the outer cladding is removed forming an exposed section of the inner cladding having a depth of only a partial distance to the core to enable light to escape the double-clad optical fiber upon impinging on at least one of a plurality of notches; and
    a notch, of the plurality of notches, being disposed such that another notch of the plurality of notches, immediately preceding the notch longitudinally along the optical fiber or immediately succeeding the notch longitudinally along the double-clad optical fiber, is displaced angularly around the core relative to the notch.

12. The cladding light stripper of claim 11, wherein a cross-section of at least one notch, of the plurality of notches, is at least one of:
 a straight line,
 a curved line,
 an angled line, or
 an irregular line.

13. The cladding light stripper of claim 11, wherein the notch extends around an entirety of a circumference of the cladding light stripper.

14. The cladding light stripper of claim 11, wherein the plurality of notches are spirally arranged.

15. The cladding light stripper of claim 11, wherein the stripped portion is laser stripped.

16. The cladding light stripper of claim 11, wherein each notch, of the plurality of notches, is formed sequentially with regard to longitudinal position.

17. The cladding light stripper of claim 11, wherein notches, within a set of notches with a common angular position, of a plurality of sets of notches, of the plurality of notches, are formed sequentially with regard to longitudinal position; and
 wherein each set of notches, of the plurality of sets of notches, is formed sequentially.

18. A cladding light stripper, comprising:
 a double-clad optical fiber having a core for guiding signal light, an inner cladding surrounding the core, and an outer cladding surrounding the inner cladding,
 wherein the double-clad optical fiber includes a stripped portion forming an exposed section,
 wherein the exposed section includes a plurality of spirally-arranged transversal notches disposed along the double-clad optical fiber to enable light to escape the inner cladding upon impinging on the plurality of spirally-arranged transversal notches,
 wherein the plurality of spirally-arranged transversal notches are disposed relative to each other longitudinally along the double-clad optical fiber and angularly around the core,
 wherein a circumferential segment of the double-clad optical fiber includes a single notch of the plurality of spirally-arranged transversal notches, and
 wherein each of the plurality of spirally-arranged transversal notches has a depth of only a partial distance to the core.

19. The cladding light stripper of claim 18, wherein a first notch, of the plurality of spirally-arranged transversal notches, overlaps with a second notch, of the plurality of spirally-arranged transversal notches and immediately succeeding the first notch, with regard to an angular position around the core and on the cladding light stripper.

20. The cladding light stripper of claim 18, wherein the partial distance to the core is between 5% and 20% of a diameter of the double-clad optical fiber.

* * * * *